(12) United States Patent
Nakura

(10) Patent No.: US 8,846,249 B2
(45) Date of Patent: *Sep. 30, 2014

(54) LITHIUM ION SECONDARY BATTERY

(75) Inventor: Kensuke Nakura, Osaka (JP)

(73) Assignee: Panasonic Corporation, Osaka (JP)

( * ) Notice: Subject to any disclaimer, the term of this patent is extended or adjusted under 35 U.S.C. 154(b) by 1672 days.

This patent is subject to a terminal disclaimer.

(21) Appl. No.: 11/794,896

(22) PCT Filed: Jun. 12, 2006

(86) PCT No.: PCT/JP2006/011708
§ 371 (c)(1),
(2), (4) Date: Jul. 9, 2007

(87) PCT Pub. No.: WO2006/134850
PCT Pub. Date: Dec. 21, 2006

(65) Prior Publication Data
US 2008/0044736 A1    Feb. 21, 2008

(30) Foreign Application Priority Data
Jun. 16, 2005 (JP) .................................. 2005-176515

(51) Int. Cl.
| H01M 4/48 | (2010.01) |
| C01G 53/00 | (2006.01) |
| H01M 4/36 | (2006.01) |
| H01M 4/505 | (2010.01) |
| H01M 4/525 | (2010.01) |
| H01M 4/131 | (2010.01) |
| H01M 10/0525 | (2010.01) |

(52) U.S. Cl.
CPC .............. *H01M 4/131* (2013.01); *C01G 53/50* (2013.01); *C01P 2002/52* (2013.01); *Y02T 10/7011* (2013.01); *C01G 53/42* (2013.01); *H01M 4/366* (2013.01); *C01P 2004/61* (2013.01); *H01M 4/505* (2013.01); *H01M 4/525* (2013.01); *H01M 10/0525* (2013.01); *C01P 2006/40* (2013.01); *Y02E 60/122* (2013.01)
USPC ..................... 429/231.1; 429/231.3; 429/223; 429/224; 429/231.5; 429/231.8; 429/338; 429/199; 429/330; 429/331; 429/307

(58) Field of Classification Search
USPC ............... 429/231.1, 231.3, 223, 224, 231.5, 429/231.8, 338, 199, 330, 331, 307
See application file for complete search history.

(56) References Cited

U.S. PATENT DOCUMENTS

| 6,730,435 | B1 | 5/2004 | Nakane et al. | |
| 7,879,494 | B2 * | 2/2011 | Nakura | 429/231.1 |
| 8,236,449 | B2 * | 8/2012 | Nakura | 429/231.3 |
| 2002/0061444 | A1 | 5/2002 | Kweon et al. | |
| 2004/0076882 | A1 * | 4/2004 | Hosoya et al. | 429/223 |
| 2004/0224230 | A1 | 11/2004 | Yanagida et al. | |
| 2005/0095507 | A1 | 5/2005 | Kim et al. | |

FOREIGN PATENT DOCUMENTS

| JP | 05-290890 | 11/1993 |
| JP | 07-320721 | 12/1995 |
| JP | 07-320789 | 12/1995 |
| JP | 09-035715 | 2/1997 |
| JP | 10-021958 | 1/1998 |
| JP | 11-016566 | 1/1999 |
| JP | 2001-196063 | 7/2001 |
| JP | 2003-173775 | 6/2003 |
| WO | WO 2005119820 | * 12/2005 |

* cited by examiner

*Primary Examiner* — Laura Weiner
(74) *Attorney, Agent, or Firm* — McDermott Will & Emery LLP

(57) ABSTRACT

The positive electrode of a lithium ion secondary battery includes active material particles represented by $Li_xNi_{1-y-z}M_yMe_zO_{2+\delta}$, and the active material particles include a lithium composite oxide represented by $Li_xNi_{1-y}M_yO_2$, (where $0.95 \le x \le 1.1$, $0 < y \le 0.75$, $0.001 \le z \le 0.05$). The element M is selected from the group consisting of alkaline-earth elements, transition elements, rare-earth elements, IIIb group elements and IVb group elements. The element Me is selected from the group consisting of Mn, W. Nb, Ta, In, Mo, Zr and Sn, and the element Me is included in a surface portion of the active material particles. The lithium content x in the lithium composite oxide in an end-of-discharge state when a constant current discharge is performed at a temperature of 25° C. with a current value of 1C and an end-of-discharge voltage of 2.5 V satisfies $0.85 \le x \le -0.013 Ln(z)+0.871$.

3 Claims, 1 Drawing Sheet

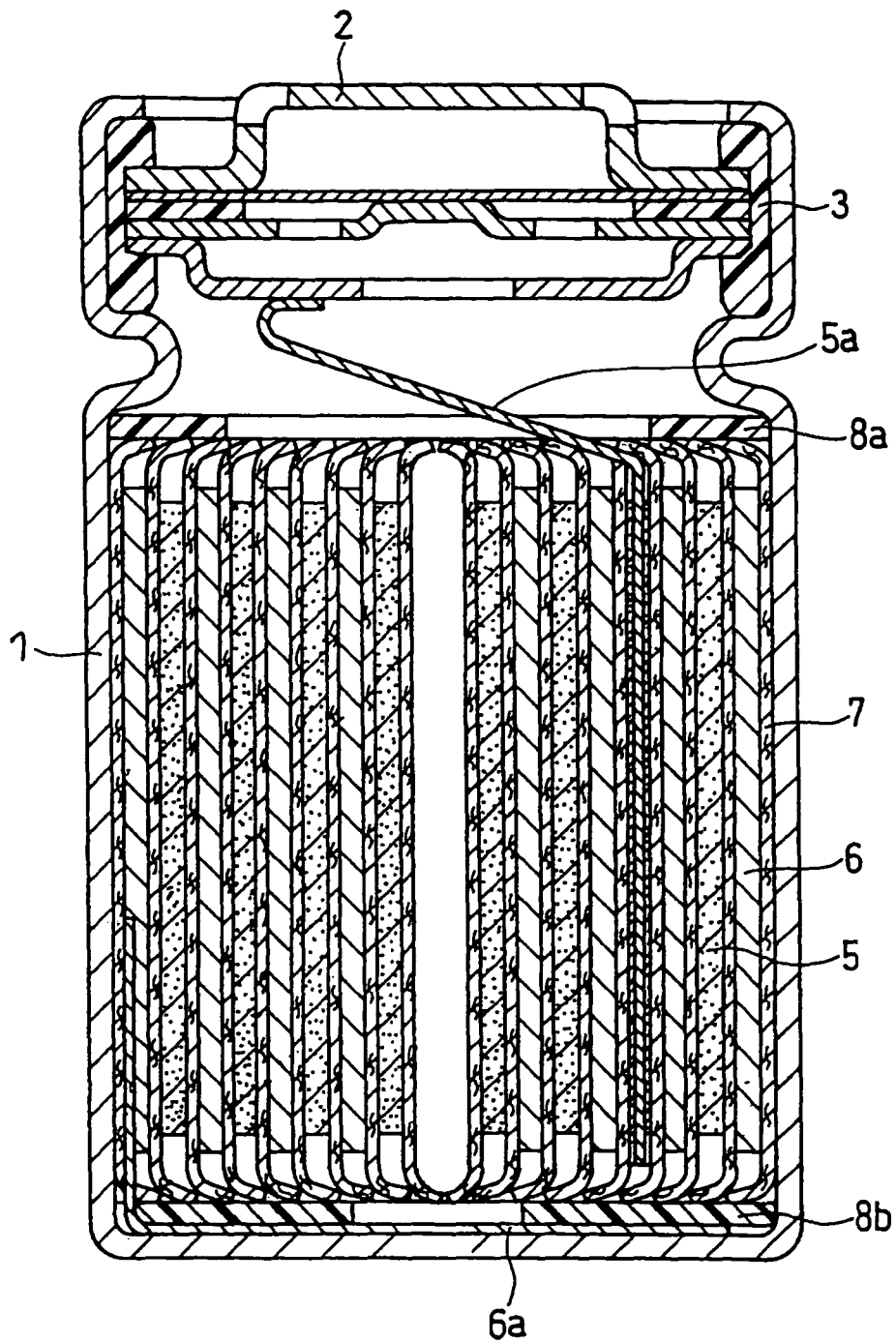

LITHIUM ION SECONDARY BATTERY

RELATED APPLICATIONS

This application is the U.S. National Phase under 35 U.S.C. §371 of International Application No. PCT/JP2006/311708, filed on Jun. 12, 2006, which in turn claims the benefit of Japanese Application No. 2005-176515, filed on Jun. 16, 2005, the disclosures of which Applications are incorporated by reference herein.

TECHNICAL FIELD

The present invention relates to a lithium ion secondary battery having excellent life characteristics.

BACKGROUND ART

Lithium ion secondary batteries, which are a typical representation of non-aqueous electrolyte secondary batteries, have a high electromotive force and a high energy density, and therefore demand for the batteries is growing as a main power source for mobile communication devices and portable electronic devices. Most of the lithium ion secondary batteries currently available in the market employ, as a positive electrode active material, a lithium composite oxide (e.g., $Li_xCoO_2$ (where x varies according to charge and discharge of the battery)) composed mainly of cobalt. However, because lithium composite oxides composed mainly of cobalt require, as a raw material, cobalt compounds which are costly, it is difficult to achieve cost reduction.

From the view point of achieving cost reduction, research and development has been conducted on various positive electrode active materials as an alternative to lithium cobalt oxide. Particularly, lithium composite oxides composed mainly of nickel (e.g., $Li_xNiO_2$ (where x varies according to charge and discharge of the battery)) are being vigorously studied.

Besides cost reduction, it is also important to increase reliability of lithium ion secondary batteries. A lithium composite oxide such as $Li_xCoO_2$ or $Li_xNiO_2$ has $Co^{4+}$ or $Ni^{4+}$ which is in a state of a high valence having a high reactivity during charge. This facilitates a decomposition reaction of an electrolyte in which a lithium composite oxide participates in a high temperature environment, generating gas in the battery and degrading life characteristics. It is known that $Li_xNiO_2$ has a higher reactivity with electrolytes in a charged state than $Li_xCoO_2$.

In order to suppress the decomposition reaction of electrolytes, there is proposed to suppress the decomposition reaction of an electrolyte in which a lithium composite oxide participates by forming a coating made of a specific metal oxide on a surface of a positive electrode active material (Patent Documents 1 to 5). As a technique of improving cycle characteristics, the control of Li amount in a positive electrode active material in an end-of-charge/discharge state is also proposed (Patent Document 6).

Patent Document 1: Japanese Laid-Open Patent Publication No. Hei 9-35715
Patent Document 2: Japanese Laid-Open Patent Publication No. Hei 11-317230
Patent Document 3: Japanese Laid-Open Patent Publication No. Hei 11-16566
Patent Document 4: Japanese Laid-Open Patent Publication No. 2001-196063
Patent Document 5: Japanese Laid-Open Patent Publication No. 2003-173775
Patent Document 6: Japanese Laid-Open Patent Publication No. Hei 5-290890

DISCLOSURE OF THE INVENTION

Problem to be Solved by the Invention

As described above, many proposals are made to suppress the generation of gas and improve cycle characteristics, but the following improvements need to be made in these techniques.

Many lithium ion secondary batteries are used in various portable devices. Those various portable devices are not always used immediately after the batteries are charged. It is often the case that the batteries are kept in a charged state for a long time, and thereafter discharged. However, in fact, the cycle life characteristics of the batteries are generally evaluated under conditions different from such actual operating conditions.

For example, a typical cycle life test is performed under conditions of a short rest (interval) time after charging (e.g., rest time: 30 minutes). If evaluations are made under such conditions, it would be possible to improve cycle life characteristics to a certain degree by the above-described techniques conventionally proposed.

However, considering the actual operating conditions, if intermittent cycles (charge/discharge cycles in which the rest time after charging is set longer) are repeated, sufficient life characteristics cannot be obtained. It is found that, for example, if a cycle life test in which the rest time is set to 720 minutes is performed, any of the above-described techniques cannot provide sufficient life characteristics. In other words, conventional lithium ion secondary batteries still have the problem that an improvement in intermittent cycle characteristics is necessary.

Means for Solving the Problem

In view of the above, it is an object of the present invention to enhance the intermittent cycle characteristics of a lithium ion secondary battery including, as a positive electrode active material, a lithium composite oxide composed mainly of nickel.

In other words, the present invention relates to a lithium ion secondary battery comprising: a positive electrode capable of charging and discharging; a negative electrode capable of charging and discharging; and a non-aqueous electrolyte, wherein the positive electrode includes active material particles, the active material particles include a lithium composite oxide, the lithium composite oxide is represented by the general formula (1): $Li_xNi_{1-y}M_yO_2$, the active material particles are represented by the general formula (2): $Li_xNi_{1-y}M_yMe_zO_{2+\delta}$, the general formulas (1) and (2) satisfy $0.95 \leq x \leq 1.1$, $0 < y \leq 0.75$ and $0.001 \leq z \leq 0.05$, the element M is at least one selected from the group consisting of alkaline-earth elements, transition elements, rare-earth elements, IIIb group elements and IVb group elements, the element Me is at least one selected from the group consisting of Mn, W, Nb, Ta, In, Mo, Zr and Sn, the element Me is included in a surface portion of the active material particles, and the lithium content x in the lithium composite oxide in an end-of-discharge state when a constant current discharge is performed under conditions of an ambient temperature of 25° C., a current value of 1 hour rate (1C) and an end-of-discharge voltage of 2.5 V satisfies $0.85 \leq x \leq -0.013 Ln(z) + 0.871$.

It is preferable that the element M comprises at least one selected from the group consisting of Co, Mn, Al, Mg, Ca, B, W, Nb, Ti, Ta, In, Mo and Sn.

The present invention encompasses a case in which the element Me has a crystal structure different from that of the element M in a surface portion of the active material particles.

It is preferable that the element Me forms an oxide having a crystal structure different from that of the lithium composite oxide.

It is preferable that the active material particles have an average particle size of not less than 10 μm.

When the non-aqueous electrolyte comprises at least one selected from the group consisting of vinylene carbonate, vinyl ethylene carbonate, phosphazene and fluorobenzene, the improvement in intermittent cycle characteristics becomes significant.

Preferred embodiments of the present invention will be shown below.

(i) A lithium ion secondary battery comprising: a positive electrode capable of charging and discharging; a negative electrode capable of charging and discharging; and a non-aqueous electrolyte, wherein the positive electrode includes active material particles, the active material particles include a lithium composite oxide, the lithium composite oxide is represented by the general formula (1): $Li_xNi_{1-y}M_yO_2$, the active material particles represented by the general formula (2): $Li_xNi_{1-y}M_yMe_zO_{2+\delta}$, the general formulas (1) and (2) satisfy $0.95 \leq x \leq 1.1$, $0 < y \leq 0.75$ and $0.001 \leq z \leq 0.05$, the element M is at least one selected from the group consisting of alkaline-earth elements, transition elements, rare-earth elements, IIIb group elements and IVb group elements, the element Me is at least one selected from the group consisting of Mn, W, Nb, Ta, In, Mo, Zr and Sn, the element Me is included in a surface portion of the active material particles, the lithium content x in the lithium composite oxide in an end-of-discharge state when a constant current discharge is performed under conditions of an ambient temperature of 25° C., a current value of 1 hour rate (1C) and an end-of-discharge voltage of 2.5 V satisfies $0.85 \leq x \leq -0.013Ln(z)+0.871$, and the element M and the element Me do not include the same type of element. Note that when the element M and/or the element Me include a plurality of elements, but the element M and the element Me do not include the same type of element, it means that the element M and the element Me do not overlap.

(ii) A lithium ion secondary battery comprising: a positive electrode capable of charging and discharging; a negative electrode capable of charging and discharging; and a non-aqueous electrolyte, wherein the positive electrode includes active material particles, the active material particles include a lithium composite oxide, the lithium composite oxide is represented by the general formula (1): $Li_xNi_{1-y}M_yO_2$, the active material particles are represented by the general formula (2): $Li_xNi_{1-y}M_yMe_zO_{2+\delta}$, the general formulas (1) and (2) satisfy $0.95 \leq x \leq 1.1$, $0 < y \leq 0.75$ and $0.0001 \leq z \leq 0.05$, the element M is at least one selected from the group consisting of alkaline-earth elements, transition elements, rare-earth elements, IIIb group elements and IVb group elements, the element Me is at least one selected from the group consisting of Mn, W, Nb, Ta, In, Mo, Zr and Sn, the element Me is included in a surface portion of the active material particles, the lithium content x in the lithium composite oxide in an end-of-discharge state when a constant current discharge is performed under conditions of an ambient temperature of 25° C., a current value of 1 hour rate (1C) and an end-of-discharge voltage of 2.5 V satisfies $0.85 \leq x \leq -0.013Ln(z)+0.871$, the element M and the element Me include the same type of element, and the element M and the element Me have different crystal structures. Note that when the element M and/or the element Me include a plurality of elements and the element M and the element Me include the same type of element, it means that the element M and the element Me overlap entirely or partially.

(iii) A lithium ion secondary battery comprising: a positive electrode capable of charging and discharging; a negative electrode capable of charging and discharging; and a non-aqueous electrolyte, wherein the positive electrode includes active material particles, the active material particles include a lithium composite oxide, the lithium composite oxide is represented by $Li_xNi_{1-y}M_yO_2$ (where $0.95 \leq x \leq 1.1$, $0 < y \leq 0.75$, the element M is at least one selected from the group consisting of alkaline-earth elements, transition elements, rare-earth elements, IIIb group elements and IVb group elements), a surface portion of the active material particles includes at least one element Me selected from the group consisting of Mn, W, Nb, Ta, In, Mo, Zr and Sn, the atomic ratio z of the element Me to the total of the Ni and the element M contained in the active material particles satisfies $0.001 \leq z \leq 0.05$, the lithium content x in the lithium composite oxide in an end-of-discharge state when a constant current discharge is performed under conditions of an ambient temperature of 25° C., a current value of 1 hour rate (1C) and an end-of-discharge voltage of 2.5 V satisfies $0.85 \leq x \leq -0.013Ln(z)+0.871$, and the element M and the element Me do not include the same type of element.

(iv) A lithium ion secondary battery comprising: a positive electrode capable of charging and discharging; a negative electrode capable of charging and discharging; and a non-aqueous electrolyte, wherein the positive electrode includes active material particles, the active material particles include a lithium composite oxide, the lithium composite oxide is represented by $Li_xNi_{1-y}M_yO_2$ (where $0.95 \leq x \leq 1.1$, $0 < y \leq 0.75$, the element M is at least one selected from the group consisting of alkaline-earth elements, transition elements, rare-earth elements, IIIb group elements and IVb group elements), a surface portion of the active material particles includes at least one element Me selected from the group consisting of Mn, W, Nb, Ta, In, Mo, Zr and Sn, the atomic ratio z of the element Me to the total of the Ni and the element M included in the active material particles satisfy $0.001 \leq z \leq 0.05$, the lithium content x in the lithium composite oxide in an end-of-discharge state when a constant current discharge is performed under conditions of an ambient temperature of 25° C., a current value of 1 hour rate (1C) and an end-of-discharge voltage of 2.5 V satisfies $0.85 \leq x \leq -0.013Ln(z)+0.871$, the element M and the element Me include the same type of element, and the element M and the element Me have different crystal structures.

Effect of the Invention

According to the present invention, in a lithium ion secondary battery including, as a positive electrode active material, a lithium composite oxide composed mainly of nickel, it is possible to improve intermittent cycle characteristics relative to conventional ones. More specifically, intermittent cycle characteristics are improved significantly by allowing the element M to be included in a lithium composite oxide composed mainly of nickel, allowing the element Me to be included in a surface portion of the active material particles, and controlling the lithium content x in the lithium composite oxide in the end-of-discharge state to fall within a predetermined range.

Controlling the lithium content x in the lithium composite oxide in the end-of-discharge state to fall within a predetermined range improves intermittent cycle characteristics only slightly, and the stability of the active material at the time of internal short-circuiting also becomes insufficient. Intermittent cycle characteristics are hardly improved only by allowing the element M to be included in a lithium composite oxide composed mainly of nickel and allowing the element Me to be included in a surface portion of the active material particles.

The reason why intermittent cycle characteristics are improved significantly by the present invention is understood only phenomenologically at this time, but it is generally considered as follows.

When the surface portion of the active material particles does not include the element Me, the Ni included in the surface portion of the lithium composite oxide has a valence close to $Ni^{4+}$ having a high reactivity in the end of charge state. Accordingly, it is difficult to improve cycle characteristics. On the other hand, when the surface portion of the active material particles includes the element Me, the Ni that exists in the surface portion of the lithium composite oxide is considered to have a valence close to $Ni^{3+}$ even in the end of charge state, and the reactivity is suppressed. This is presumably because the valence of the element Me becomes not less than 4, and the electrical neutrality is maintained.

However, the element Me has a valence not less than 4, whereby $Ni^{2+}$ is produced inside the lithium composite oxide in the end-of-discharge state. For this reason, it is surmised that the $Ni^{2+}$ leaches out into the electrolyte, and the improvement in intermittent cycle characteristics is inhibited. On the other hand, by controlling the lithium content x in the lithium composite oxide in the end-of-discharge state to fall within a predetermined range, even when the surface portion of the active material particles includes the element Me, it is found that the generation of $Ni^{2+}$ is suppressed. Accordingly, it is surmised that the leach-out of $Ni^{2+}$ into the electrolyte is suppressed, and intermittent cycle characteristics are improved.

It is difficult at this time to clearly analyze in which state the element Me is included in the surface portion of the active material particles. However, the fact that the element Me exists in the state of an oxide in at least part of the surface of the lithium composite oxide, and that the element Me exists in the state of an oxide or lithium-containing oxide having a crystal structure different from that of the lithium composite oxide can be confirmed by various analyses. Examples of such analytical methods include: elemental mapping by EPMA (Electron Probe Micro-Analysis); analysis of chemical bonding state by XPS (X-ray Photoelectron Spectroscopy); and surface composition analysis by SIMS (Secondary Ionization Mass Spectroscopy).

BRIEF DESCRIPTION OF THE DRAWING

FIG. 1 is a vertical cross sectional view of a cylindrical lithium ion secondary battery according to an example of the present invention.

BEST MODE FOR CARRYING OUT THE INVENTION

The positive electrode of the present invention will be described. The positive electrode contains active material particles as described below.

The active material particles include a lithium composite oxide composed mainly of nickel. The morphology of the lithium composite oxide is not particularly limited, but for example, there are cases where the active material particles are formed in the state of primary particles or where the active material particles are formed in the state of secondary particles. A plurality of active material particles may be aggregated to form a secondary particle. The average particle size of the active material particles are not particularly limited, but the size is preferably, for example, 1 to 30 µm, and more preferably 10 to 30 µm. The average particle size can be measured by, for example, a wet type laser diffraction particle size distribution analyzer manufactured by Microtrac Inc. In this case, a value at 50% accumulation based on volume (median value: $D_{50}$) can be regarded as the average particle size of the active material particles.

The lithium composite oxide is represented by the general formula: $Li_xNi_{1-y}M_yO_2$ (where $0.95 \leq x \leq 1.1$, $0 < y \leq 0.75$, and the element M is at least one selected from the group consisting of alkaline-earth elements, transition elements, rare-earth elements, IIIb group elements and IVb group elements). The element M imparts the effect of improving thermal stability or the like to the lithium composite oxide.

The lithium composite oxide comprises, as the element M, preferably at least one selected from the group consisting of Co, Mn, Al, Mg, Ca, B, W, Nb, Ti, Ta, In, Mo and Sn. These elements may be included singly as the element M in the lithium composite oxide, or may be included in combination of two or more. Among these, Co, Al, Mn, Ca and Mg are preferable as the element M. Particularly, Co and Al are preferable because the effect of improving thermal stability of the lithium composite oxide is large.

The range of x that represents the Li amount can increase or decrease by charge and discharge of the battery, but the range of x in the initial state (immediately after the synthesis of the lithium composite oxide) is $0.95 \leq x \leq 1.1$.

The range of y that represents the amount of the element M can be $0 < y \leq 0.75$. However, considering the balance between the thermal stability and capacity of the lithium composite oxide, the range is preferably $0.05 \leq y \leq 0.65$, and more preferably $0.1 \leq y \leq 0.5$. When the range is $0.75 < y$, the advantage obtained by the use of an active material composed mainly of the Ni, that is, a high capacity specific to Ni cannot be achieved.

When the element M includes Co, the atomic ratio a of the Co to the total of the Ni and the element M is preferably $0.05 \leq a \leq 0.5$, and more preferably $0.05 \leq a \leq 0.25$. When the element M includes Al, the atomic ratio b of the Al to the total of the Ni and the element M is preferably $0.005 \leq b \leq 0.1$, and more preferably $0.01 \leq b \leq 0.08$. When the element M includes Mn, the atomic ratio c of the Mn to the total of the Ni and the element M is preferably $0.005 \leq c \leq 0.5$, and more preferably $0.01 \leq c \leq 0.35$. When the element M includes an alkaline-earth element, the atomic ratio d of the alkaline-earth element to the total of the Ni and the element M is preferably $0.00002 \leq d \leq 0.1$, and more preferably $0.0001 \leq d \leq 0.05$.

The lithium composite oxide represented by the above general formula can be synthesized by calcining a raw material having a predetermined metal element ratio in an oxidizing atmosphere. The raw material includes lithium, nickel and the element M. The raw material includes an oxide, hydroxide, oxyhydroxide, carbonate, nitrate or organic complex salt of each metal element. These may be used singly or in combination of two or more.

From the view point of making the synthesis of the lithium composite oxide easy, it is preferable that the raw material includes a solid solution containing a plurality of metal elements. The solid solution containing a plurality of metal elements can be formed in any of an oxide, hydroxide, oxyhydroxide, carbonate, nitrate and organic complex salt. For example, a solid solution containing Ni and Co, a solid solution containing Ni, Co and Al, and a solid solution containing Ni, Co and Mn can be used.

The calcining temperature of the raw material and the oxygen partial pressure of the oxidizing atmosphere depend on the composition and amount of the raw material, on the synthesis device or the like, but a person skilled in the art can appropriately select appropriate conditions.

The surface portion of the active material particles of the present invention includes the element Me. In other words, the active material particles of the present invention can be represented by the general formula: $Li_xNi_{1-y}M_yMe_zO_{2+\delta}$, where the element Me is at least one selected from the group consisting of Mn, W, Nb, Ta, In, Mo, Zr and Sn. The range of z is $0.001 \le z \le 0.05$. The surface portion of the active material particles may include the element Me singly that is selected from the group consisting of Mn, W, Nb, Ta, In, Mo, Zr and Sn, or may include any combination of two or more.

It is preferable that the element Me, in the state of an oxide or lithium-containing oxide, is deposited on and attached to or carried on the surface of the lithium composite oxide.

The element M incorporated in the lithium composite oxide to form a solid solution and the element Me included in the surface portion of the active material particles may or may not include the same type of element. Even when the element M and the element Me include the same type of element, because these have different crystal structures, they can be clearly distinguished from each other. The element Me is not incorporated into the lithium composite oxide to form a solid solution, and it only forms mainly an oxide having a crystal structure different from that of the lithium composite oxide in the surface portion of the active material particles. The element M and the element Me can be distinguished by various analytical methods including EPMA, XPS and SIMS.

The range of the atomic ratio z of the element Me to the total of the Ni and the element M included in the active material particles can be $0.001 \le z \le 0.05$. When z is less than 0.001, the valence of the Ni included in the surface portion of the lithium composite oxide in the end of charge state cannot be close to 3. Accordingly, it becomes difficult to suppress the reactivity of the active material particles, and intermittent cycle characteristics cannot be improved. On the other hand, when z exceeds 0.05, the surface portion of the active material particles serves as a resistant layer, and the overvoltage increases. Therefore, intermittent cycle characteristics starts decreasing.

There is a case in which the concentration of the element M in the lithium composite oxide is higher near the surface portion than the inside of the active material particles by diffusion of the element Me in the surface portion into the lithium composite oxide. In other words, there is a case in which the element Me in the surface portion transforms into the element M that forms the lithium composite oxide. However, the element M derived from the element Me diffused into the lithium composite oxide exists near the surface portion, and has a similar effect to that of the element Me. In the case where the element M and the element Me do not include the same type of element, the value of z is the total of the element Me in the surface portion and the element M derived from the element Me diffused into the lithium composite oxide near the surface portion. Also, in the case where the element M and the element Me include the same type of element, the value of z is the total of the element Me in the surface portion and the element M derived from the element Me diffused into the lithium composite oxide near the surface portion. The element M derived from the element Me diffused into the lithium composite oxide can be ignored. Because the amount of the element Me diffused into the lithium composite oxide is very small, even if ignored, it has little influence on the effect of the present invention.

An example of the method for producing the positive electrode will be described.

(i) First Step

A lithium composite oxide represented by the general formula: $Li_xNi_{1-y}M_yO_2$ (where $0.95 \le x \le 1.1$, $0 < y \le 0.75$, and the element M is at least one selected from the group consisting of Co, Mn, Al, Mg, Ca, B, W, Nb, Ti, Ta, In, Mo and Sn) is prepared. The preparation method of the lithium composite oxide is not particularly limited. The lithium composite oxide can be synthesized by, for example, calcining a raw material having a predetermined metal element ratio in an oxidizing atmosphere. The calcining temperature and the oxygen partial pressure of the oxidizing atmosphere are selected appropriately according to the composition and amount of the raw material, to the synthesis device or the like.

(ii) Second Step

The prepared lithium composite oxide is allowed to carry the raw material of the element Me (at least one selected from the group consisting of Mn, W, Nb, Ta, In, Mo, Zr and Sn). In this process, the average particle size of the lithium composite oxide is not particularly limited, but the size is preferably 1 to 30 μm, for example. Normally, the value of z can be determined from the amount of the raw material of the element Me used here relative to that of the lithium composite oxide.

As the raw material of the element Me, a sulfate, nitrate, carbonate, chloride, hydroxide, oxide or alkoxide containing the element Me is used. They may be used singly or in combination of two or more. Among these, it is particularly preferable to use the sulfate, nitrate, chloride or alkoxide in terms of battery performance. The method whereby the raw material of the element Me is carried on the lithium composite oxide is not particularly limited. For example, the raw material of the element Me is dissolved or dispersed in a liquid component to prepare a solution or dispersion. The resultant is mixed with the lithium composite oxide, after which the liquid component is removed.

The liquid component in which the raw material of the element Me is dissolved or dispersed is not particularly limited. However, it is preferable to use ketones such as acetone and methyl ethyl ketone (MEK), ethers such as tetrahydrofuran (THF), alcohols such as ethanol and other organic solvents. It is also possible to use alkaline water having a pH of 10 to 14.

When the lithium composite oxide is introduced into the obtained solution or dispersion and stirred, the temperature of the liquid is not particularly limited. However, from the view point of workability and production cost, it is preferable to control the temperature to 20 to 40° C. The stirring time is not particularly limited, for example, stirring for 3 hours is sufficient. The method for removing the liquid component is not particularly limited, for example, drying at a temperature of about 100° C. for 2 hours is sufficient.

(iii) Third Step

The lithium composite oxide having the element Me carried on the surface is baked at 650 to 750° C. for 2 to 24 hours, preferably for 6 hours, in an oxidizing atmosphere. In this process, it is preferable that the pressure of the oxidizing atmosphere is 101 to 50 KPa. By this calcining, the element Me is mainly transformed into an oxide having a crystal structure different from that of the lithium composite oxide.

(iv) Fourth Step

Using the active material particles, a positive electrode is produced. The method for producing the positive electrode is not particularly limited. Generally, a positive electrode is produced in which a positive electrode material mixture containing active material particles and a binder is carried on a strip-shaped positive electrode core member (positive electrode current collector). In the positive electrode material mixture, an additive such as a conductive material may be included as an optional component besides the above. The positive electrode material mixture can be carried on the core member by preparing a paste by dispersing the positive electrode material mixture in a liquid component, applying the paste to the core member, followed by drying.

As the binder included in the positive electrode material mixture, either of a thermoplastic resin or a thermosetting resin may be used, but a thermoplastic resin is preferable. Examples of such a thermoplastic resin include polyethylene, polypropylene, polytetrafluoroethylene (PTFE), polyvinylidene fluoride (PVDF), styrene butadiene rubber, tetrafluoroethylene-hexafluoropropylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinylether-tetrafluoroethylene copolymer, ethylene-acrylic acid copolymer, ethylene-methacrylic acid copolymer, ethylene-methyl acrylate copolymer and ethylene-methyl methacrylate copolymer. They may be used singly or in combination of two or more. These may be a crosslinked one with Na ions.

As the conductive material included in the positive electrode material mixture, any material can be used as long as it is an electron conductive material that is chemically stable in the battery. For example, it is possible to use graphites such as natural graphite (flake graphite or the like) and artificial graphite; carbon blacks such as acetylene black, ketjen black, channel black, furnace black, lamp black and thermal black; conductive fibers such as carbon fiber and metal fiber; metal powders such as aluminum powder; conductive whiskers such as zinc oxide and potassium titanate; conductive metal oxides such as titanium oxide; organic conductive materials such as polyphenylene derivatives; and carbon fluoride. They may be used singly or in combination or two or more. The added amount of the conductive material is not particularly limited, but the amount is preferably 1 to 50 wt % relative to the amount of the active material particles contained in the positive electrode material mixture, more preferably 1 to 30 wt %, and particularly preferably 2 to 15 wt %.

The positive electrode core member (positive electrode current collector) can be any material as long as it is an electron conductor that is chemically stable in the battery. For example, it is possible to use a foil or sheet made of aluminum, stainless steel, nickel, titanium, carbon or a conductive resin. Particularly, an aluminum foil or an aluminum alloy foil is preferable. It is also possible to apply a layer of carbon or titanium to the surface of the foil or sheet, or form an oxide layer on the same. It is also possible to add roughness to the surface of the foil or sheet. It is also possible to use a net, punched sheet, lath, porous sheet, foam or molded article formed of fiber bundle. The thickness of the positive electrode core member is not particularly limited, but the thickness is, for example, within a range of 1 to 500 μm.

In the following, the component parts of the lithium ion secondary battery of the present invention other than the positive electrode will be described. However, the following description is not intended to limit the present invention.

As the negative electrode capable of charging and discharging lithium, for example, it is possible to use a negative electrode in which a negative electrode material mixture including a negative electrode active material, a binder and optional components such as a conductive material and a thickener is carried on a negative electrode core member. Such a negative electrode can be produced in the same manner as the positive electrode.

The negative electrode active material may be a material capable of electrochemically charging and discharging lithium. For example, it is possible to use graphites, non-graphitizable carbon materials, lithium alloys, metal oxides and the like. It is preferable that the lithium alloy is an alloy containing at least one selected from the group consisting of silicon, tin, aluminum, zinc and magnesium. As the metal oxide, an oxide containing silicon and an oxide containing tin are preferable. It is more preferable that the metal oxide is hybridized with a carbon material. The average particle size of the negative electrode active material is not particularly limited, but the size is preferably 1 to 30 μm.

As the binder included in the negative electrode material mixture, either of a thermoplastic resin or a thermosetting resin may be used, but a thermoplastic resin is preferable. Examples of such a thermoplastic resin include polyethylene, polypropylene, polytetrafluoroethylene (PTFE), polyvinylidene fluoride (PVDF), styrene butadiene rubber, tetrafluoroethylene-hexafluoropropylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinylether-tetrafluoroethylene copolymer, ethylene-acrylic acid copolymer, ethylene-methacrylic acid copolymer, ethylene-methyl acrylate copolymer and ethylene-methyl methacrylate copolymer. They may be used singly or in combination of two or more. These may be a crosslinked one with Na ions.

As the conductive material included in the negative electrode material mixture, any material can be used as long as it is an electron conductive material that is chemically stable in the battery. For example, it is possible to use graphites such as natural graphite (flake graphite or the like) and artificial graphite; carbon blacks such as acetylene black, ketjen black, channel black, furnace black, lamp black and thermal black; conductive fibers such as carbon fiber and metal fiber; metal powders such as copper powder and nickel powder; and organic conductive materials such as polyphenylene derivatives. They may be used singly or in combination or two or more. The added amount of the conductive material preferably is not particularly limited, but the amount is preferably 1 to 30 wt % relative to the amount of the active material particles included in the negative electrode material mixture, and more preferably 1 to 10 wt %.

The negative electrode core member (negative electrode current collector) can be any material as long as it is an electron conductor that is chemically stable in the battery. For example, it is possible to use a foil or sheet made of stainless steel, nickel, copper, titanium, carbon or a conductive resin. Particularly, copper or a copper alloy is preferable. It is also possible to apply a layer of carbon, titanium or nickel to the surface of the foil or sheet, or form an oxide layer on the same. It is also possible to add roughness to the surface of the foil or sheet. It is also possible to use a net, punched sheet, lath, porous sheet, foam or molded article formed of fiber bundle. The thickness of the negative electrode core member is not particularly limited, but the thickness is, for example, within a range of 1 to 500 µm.

As the non-aqueous electrolyte, it is preferable to use a non-aqueous solvent in which a lithium salt is dissolved.

Examples of the non-aqueous solvent include: cyclic carbonates such as ethylene carbonate (EC), propylene carbonate (PC) and butylene carbonate (BC); chain carbonates such as dimethyl carbonate (DMC), diethyl carbonate (DEC), ethyl methyl carbonate (EMC) and dipropyl carbonate (DPC); aliphatic carboxylic acid esters such as methyl formate, methyl acetate, methyl propionate and ethyl propionate; lactones such as γ-butyrolactone and γ-valerolactone; chain ethers such as 1,2-dimethoxyethane (DME), 1,2-diethoxyethane (DEE) and ethoxymethoxyethane (EME); cyclic ethers such as tetrahydrofuran and 2-methyltetrahydrofuran; dimethyl sulfoxide; 1,3-dioxolane; formamide; acetamide; dimethylformamide; dioxolane; acetonitrile; propylnitrile; nitromethane; ethyl monoglyme; phosphoric acid triester; trimethoxymethane; dioxolane derivative; sulfolane; methylsulfolane; 1,3-dimethyl-2-imidazolidinone; 3-methyl-2-oxazolidinone; propylene carbonate derivative; tetrahydrofuran derivative; ethyl ether; 1,3-propanesultone; anisole; dimethyl sulfoxide; and N-methyl-2-pyrrolidone. They may be used singly, but it is preferable to combine two or more. Particularly, a solvent mixture composed of a cyclic carbonate and a chain carbonate or a solvent mixture composed of a cyclic carbonate, a chain carbonate and an aliphatic carboxylic acid ester is preferable.

As the lithium salt dissolved in the non-aqueous solvent, there are, for example, $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, LiCl, LiBr, LiI, chloroboran lithium, lithium tetraphenylborate and lithium imide salt. These may be used singly or in combination of two or more, but it is preferable to use at least $LiPF_6$. The amount of the lithium salt dissolved in the non-aqueous solvent is not particularly limited, but it is preferable that the lithium salt concentration is 0.2 to 2 mol/L, and more preferably 0.5 to 1.5 mol/L.

For the purpose of improving the charge/discharge characteristics of the battery, various additives can be added. As the additives, it is preferable to use, for example, at least one selected from the group consisting of vinylene carbonate, vinyl ethylene carbonate, phosphazene and fluorobenzene. An appropriate amount of these additives is 0.5 to 20 wt % of the non-aqueous electrolyte.

It is also possible to use other various additives such as triethyl phosphate, triethanolamine, a cyclic ether, ethylene diamine, n-glyme, pyridine, triamide hexaphosphate, nitrobenzene derivative, crown ether, quaternary ammonium salt and ethylene glycol dialkyl ether.

It is necessary to interpose a separator between the positive electrode and the negative electrode.

As the separator, an insulating microporous thin film having a large ion permeability and a predetermined mechanical strength is preferably used. It is preferable that the microporous thin film closes the pores at not less than a given temperature and has a function of increasing a resistance. As the material of the microporous thin film, a polyolefin having excellent resistance to organic solvents and hydrophobicity such as polypropylene or polyethylene is preferably used. It is also possible to use a sheet, non-woven fabric or woven fabric produced from glass fibers. The pore size of the separator is, for example, 0.01 to 1 µm. The thickness of the separator is generally 10 to 300 µm. The porosity of the separator is generally 30 to 80%.

It is also possible to integrate a polymer electrolyte made of a non-aqueous electrolyte and a polymer material that retains the non-aqueous electrolyte as the separator with the positive or negative electrode. The polymer material can be any material as long as it can retain the non-aqueous electrolyte. Particularly, a copolymer of vinylidene fluoride and hexafluoropropylene is preferable.

Next, in the lithium ion secondary battery of the present invention, the lithium content x in the lithium composite oxide in an end-of-discharge state when a constant current discharge is performed under conditions of an ambient temperature of 25° C., a current value of 1 hour rate (1C) and an end-of-discharge voltage of 2.5 V satisfies $0.85 \leq x \leq -0.013 \text{Ln}(z)+0.871$.

When the value of x in the above-described end-of-discharge state is less than 0.85, a sufficient capacity cannot be obtained. In a range where the value of x satisfies $x > -0.013\text{Ln}(z)+0.871$, $Ni^{2+}$ is produced in the lithium composite oxide in the end-of-discharge state. Accordingly, because $Ni^{2+}$ leaches out into the electrolyte, intermittent cycle characteristics are not improved. When z=0.001 and 0.05, in order to improve intermittent cycle characteristics, it is necessary to set the value of x in the above-described end-of-discharge state to not greater than 0.961 and not greater than 0.91, respectively.

The method for controlling the value of x in the above-described end-of-discharge state to $0.85 \leq x \leq -0.013\text{Ln}(z)+0.871$ is not particularly limited, but generally, the method depends on the battery design. For example, the value of x is controlled by the control of the weight ratio between the positive electrode active material and the negative electrode active material, the control of the irreversible capacity of the negative electrode active material, the control of the synthesis conditions of the positive electrode active material, the control of the crystallinity or disorder of the positive electrode active material, and the immobilization of Li by the additive (s) included in the electrolyte or negative electrode. Because these are known techniques regarding the battery design, the method for controlling the value of x to $0.85 \leq x \leq -0.013\text{Ln}(z)+0.871$ is an obvious technical matter for a person skilled in the art.

Next, the present invention will be described specifically based on examples, but the present invention is not intended to be limited to the following examples. In the following examples, by controlling the weight ratio between the positive electrode active material and the negative electrode active material, the lithium content x in the lithium composite oxide in the end-of-discharge state when a constant current discharge was performed under conditions of an ambient temperature of 25° C., a current value of 1 hour rate (1C) and an end-of-discharge voltage of 2.5 V was controlled to fall within a range of $0.85 \leq x \leq -0.013\text{Ln}(z)+0.871$.

Example 1

Example Battery A1
(1) Synthesis of Lithium Composite Oxide

Nickel sulfate, cobalt sulfate and aluminum sulfate were mixed such that the molar ratio of Ni atoms, Co atoms and Al atoms was 80:15:5. This mixture in an amount of 3.2 kg was dissolved in 10 L of water to obtain a raw material solution. To the raw material solution, 400 g of sodium hydroxide was added and a precipitate was produced. The precipitate was sufficiently washed with water, and dried to obtain a coprecipitated hydroxide.

The obtained Ni—Co—Al coprecipitated hydroxide in an amount of 3 kg was mixed with 784 g of lithium hydroxide, and the mixture was calcined at a synthesis temperature of 750° C. in an atmosphere with an oxygen partial pressure of 0.5 atmospheres for 10 hours. As a result, a Ni—Co—Al lithium composite oxide ($LiNi_{0.8}Cu_{0.15}Al_{0.05}O_2$) having an average particle size of 12 μm and containing Co and Al as the element M was obtained.

(2) Synthesis of Active Material Particles

<i> First Step

In a solution in which niobium chloride was dissolved in 10 L of ethanol, 2 kg of the synthesized lithium composite oxide was dispersed. The amount of niobium chloride was set to 0.1 mol % relative to that of the lithium composite oxide. The ethanol solution in which the lithium composite oxide was dispersed was stirred at 25° C. for 3 hours and filtered, and the solid component was dried at 100° C. for 2 hours. As a result, a lithium composite oxide having niobium (Nb) as the element Me carried on the surface.

<ii> Second Step

The dried powders were pre-calcined at 300° C. in a dry air atmosphere (humidity: 19%, pressure: 101 KPa) for 6 hours.

Subsequently, the pre-calcined powder was calcined at 650° C. in 100% oxygen atmosphere (pressure: 101 KPa) for 6 hours.

Finally, the calcined powders were annealed at 400° C. in 100% oxygen atmosphere (pressure: 101 KPa) for 4 hours.

By this calcining, active material particles containing the lithium composite oxide and having a surface portion containing Nb were obtained. The presence of Nb in the surface portion was confirmed by XPS, EPMA, ICP emission spectrometry or the like. In the following examples also, similarly, the presence of the element Me in the surface portion of the active material particles was confirmed by XPS, EPMA, ICP emission spectrometry or the like.

(3) Production of Positive Electrode

The obtained active material particles (average particle size: 12 μm) in an amount of 1 kg were stirred together with 0.5 kg of PVDF#1320 (an N-methyl-2-pyrrolidone (NMP) solution with 12 wt % of solid component) manufactured by Kureha Chemical Industry Co., Ltd., 40 g of acetylene black and an appropriate amount of NMP in a double arm kneader to prepare a positive electrode material mixture paste. This paste was applied onto both surfaces of an aluminum foil having a thickness of 20 μm, and the resultant was dried and rolled such that the total thickness was 160 μm. The obtained electrode plate was cut to have a width that allows it to be inserted into a battery case for 18650 size cylindrical batteries to obtain a positive electrode.

(4) Production of Negative Electrode

Artificial graphite in an amount of 3 kg was stirred together with 200 g of BM-400B (a dispersion containing 40 wt % modified styrene-butadiene rubber as a solid component) manufactured by Zeon Corporation, Japan, 50 g of carboxymethyl cellulose (CMC) and an appropriate amount of water in a double arm kneader to prepare a negative electrode material mixture paste. This paste was applied onto both surfaces of a copper foil having a thickness of 12 μm such that the ratio (=wp/wn) of positive electrode active material weight wp to negative electrode active material weight wn was 1.56, and the resultant was dried such that the total thickness was 160 μm. Thereafter, the obtained electrode plate was cut to have a width that allows it to be inserted into a battery case for 18650 size cylindrical batteries to obtain a negative electrode.

In this example, because z=0.001, −0.013Ln(z)+0.871 equals 0.961. Accordingly, it is necessary to control the lithium content x in the lithium composite oxide in the end-of-discharge state when a constant current discharge was performed under conditions of an ambient temperature of 25° C., a current value of 1 hour rate (1C) and an end-of-discharge voltage of 2.5 V to fall within a range of $0.85 \leq x \leq 0.961$. In this example, by setting the wp/wn ratio to 1.55 as described above, the lithium content x in the lithium composite oxide in the above-described end-of-discharge state was controlled to 0.94.

(5) Assembly of Battery

As shown in FIG. 1, the positive electrode 5 and the negative electrode 6 were spirally wound with a separator 7 interposed therebetween to form a spirally wound electrode plate assembly. As the separator 7, a composite film (Celgard 2300 manufactured by Celgard Inc., thickness: 25 μm) of polyethylene and polypropylene was used.

To the positive electrode 5 and the negative electrode 6, a positive electrode lead 5a and a negative electrode lead 6a which were made of nickel were attached, respectively. On the top face of this electrode plate assembly, an upper insulating plate 8a was provided, and on the bottom face, a lower insulating plate 8b was provided, and the resultant was inserted into a battery case 1, and 5 g of a non-aqueous electrolyte was injected into the battery case 1.

The non-aqueous electrolyte was prepared by mixing ethylene carbonate and methyl ethyl carbonate at a volume ratio of 10:30, adding 2 wt % of vinylene carbonate, 2 wt % of vinyl ethylene carbonate, 5 wt % of fluorobenzene and 5 wt % of phosphazene to the obtained solvent mixture, and dissolving $LiPF_6$ at a concentration of 1.5 mol/L.

Thereafter, a sealing plate 2 provided with an insulating gasket 3 at its periphery and the positive electrode lead 5a were electrically connected with each other, and the opening of the battery case 1 was sealed by the sealing plate 2. In this manner, a 18650 size cylindrical lithium secondary battery was produced. This battery was named Battery A1.

Example Battery A2

Battery A2 was produced in the same manner as Battery A1, except that the amount of niobium chloride dissolved in 10 L of ethanol was changed to 5.0 mol % relative to that of the lithium composite oxide and the wp/wn ratio was changed to 1.45.

Example Battery A3

The lithium composite oxide in an amount of 2 kg was dispersed in, instead of the ethanol solution of niobium chloride, 1 L of an aqueous solution of sodium hydroxide having a pH of 13. To the obtained dispersion, an aqueous solution in which manganese (Mn) sulfate was dissolved in 100 g of distilled water was added dropwise over 10 minutes, and thereafter, it was stirred at 100° C. for 3 hours. The amount of manganese sulfate was set to 0.1 mol % relative to that of the lithium composite oxide. Battery A3 was produced in the same manner as Battery A1, except for the above.

Example Battery A4

Battery A4 was produced in the same manner as Battery A3, except that the amount of manganese sulfate dissolved in 100 g of distilled water was changed to 5.0 mol % relative to that of the lithium composite oxide and the wp/wn ratio was changed to 1.45.

Example Battery A5

In a solution in which pentaethoxy tantalum (Ta) was dissolved in 10 L of ethanol, 2 kg of the synthesized lithium composite oxide was dispersed. The amount of pentaethoxy tantalum was set to 0.1 mol % relative to that of the lithium composite oxide. Battery A5 was produced in the same manner as Battery A1, except that the ethanol solution in which the lithium composite oxide was dispersed was stirred at 60° C. for 3 hours.

Example Battery A6

Battery A6 was produced in the same manner as Battery A5, except that the amount of pentaethoxy tantalum dissolved in 10 L of ethanol was changed to 5.0 mol % relative to that of the lithium composite oxide and the wp/wn ratio was changed to 1.45.

Example Battery A7

Battery A7 was produced in the same manner as Battery A3, except that manganese sulfate was changed to disodium molybdate dihydrate.

Example Battery A8

Battery A8 was produced in the same manner as Battery A7, except that the amount of disodium molybdate dihydrate dissolved in 100 g of distilled water was changed to 5.0 mol % relative to that of the lithium composite oxide and the wp/wn ratio was changed to 1.45.

Example Battery A9

Example Battery A9 was produced in the same manner as Battery A5, except that, instead of the ethanol solution of pentaethoxy tantalum, a solution in which indium nitrate was dissolved in 1 L of ethanol was used. The amount of indium nitrate was set to 0.1 mol % relative to that of the lithium composite oxide.

Example Battery A10

Battery A10 was produced in the same manner as Battery A9, except that the amount of indium nitrate dissolved in 1 L of ethanol was changed to 5.0 mol % relative to that of the lithium composite oxide and the wp/wn ratio was changed to 1.45.

Example Battery A11

Battery A11 was produced in the same manner as Battery A3, except that manganese sulfate was changed to tin (Sn) sulfate.

Example Battery A12

Battery A12 was produced in the same manner as Battery A11, except that the amount of tin sulfate dissolved in 100 g of distilled water was changed to 5.0 mol % relative to that of the lithium composite oxide and the wp/wn ratio was changed to 1.45.

Example Battery A13

Battery A13 was produced in the same manner as Battery A1, except that niobium chloride was changed to tetraethoxy titanium (Ti).

Example Battery A14

Battery A14 was produced in the same manner as Battery A13, except that the amount of tetraethoxy titanium dissolved in 100 g of distilled water was changed to 5.0 mol % relative to that of the lithium composite oxide and the wp/wn ratio was changed to 1.45.

Example Battery A15

Battery A15 was produced in the same manner as Battery A1, except that niobium chloride was changed to zirconium (Zr) tetrabutoxide.

Example Battery A16

Battery A16 was produced in the same manner as Battery A15, except that the amount of zirconium tetrabutoxide dissolved in 100 g of distilled water was changed to 5.0 mol % relative to that of the lithium composite oxide and the wp/wn ratio was changed to 1.45.

Example Battery A17

Battery A17 was produced in the same manner as Battery A3, except that manganese sulfate was changed to sodium tungstate (W).

Example Battery A18

Battery A18 was produced in the same manner as Battery A17, except that the amount of sodium tungstate dissolved in 100 g of distilled water was changed to 5.0 mol % relative to that of the lithium composite oxide and the wp/wn ratio was changed to 1.45.

Comparative Batteries a1 to a9

Batteries a1 to a9 were produced in the same manner as Batteries A1, A3, A5, A7, A9, A11, A13, A15 and A17, except that the amounts of niobium chloride, manganese sulfate, pentaethoxy tantalum, disodium molybdate dihydrate, indium nitrate, tin sulfate, tetraethoxy titanium, zirconium tetrabutoxide and sodium tungstate were set to 6 mol % (z=0.06) relative to that of the lithium composite oxide ($LiNi_{0.8}Cu_{0.15}Al_{0.05}O_2$), and the wp/wn ratio was set to 1.40.

Comparative Batteries a10 to a18

Batteries a10 to a18 were produced in the same manner as Batteries A1, A3, A5, A7, A9, A11, A13, A15 and A17, except that the wp/wn ratio was set to 1.60.

Comparative Batteries a19 to a27

Batteries a19 to a27 were produced in the same manner as Batteries A1, A3, A5, A7, A9, A11, A13, A15 and A17, except that the wp/wn ratio was set to 1.37.

Comparative Batteries a28 to a36

Batteries a28 to a36 were produced in the same manner as Batteries A1, A3, A5, A7, A9, A11, A13, A15 and A17, except that the amounts of niobium chloride, manganese sulfate, pentaethoxy tantalum, disodium molybdate dihydrate, indium nitrate, tin sulfate, tetraethoxy titanium, zirconium tetrabutoxide and sodium tungstate were set to 0.08 mol % (z=0.0008) relative to that of the lithium composite oxide ($LiNi_{0.80}Cu_{0.15}Al_{0.05}O_2$), and the wp/wn ratio was set to 1.55.

Example Battery a37

Battery a37 was produced in the same manner as Battery A1, except that the same lithium composite oxide ($LiNi_{0.8}Co_{0.15}Al_{0.05}O_2$) as above was used as a positive electrode active material, the wp/wn ratio was set to 1.42, and the lithium content x in the lithium composite oxide in the end-of-discharge state was controlled to 0.89.

The value of $-0.013\text{Ln}(z)+0.871$, and the value of x that represents the lithium content in the lithium composite oxide in the end-of-discharge state when a constant current discharge was performed under conditions of an ambient temperature of 25° C., a current value of 1 hour rate (1C) and an end-of-discharge voltage of 2.5 V for Batteries A1 to 18 and Batteries a1 to 37 are shown in Tables 1A and 1B.

TABLE 1A

| Battery No. | | Added Element Me | Added amount (mol %) | Wp/Wn value | Upper limit value = $-0.013 \ln(z) + 0.871$ (Lower limit value = 0.85) | Value of x in end-of-discharge state | Intermittent cycle characteristics Capacity after 500 cycles Charge/discharge rest | |
|---|---|---|---|---|---|---|---|---|
| | | | | | | | 30 min. (mAh) | 720 min. (mAh) |
| Example | A1 | Nb | 0.1 | 1.56 | 0.961 | 0.94 | 2182 | 2100 |
| Example | A2 | | 5.0 | 1.45 | 0.910 | 0.89 | 2079 | 2000 |
| Example | A3 | Mn | 0.1 | 1.56 | 0.961 | 0.95 | 2177 | 2102 |
| Example | A4 | | 5.0 | 1.45 | 0.910 | 0.87 | 2012 | 1950 |
| Example | A5 | Ta | 0.1 | 1.56 | 0.961 | 0.94 | 2182 | 2112 |
| Example | A6 | | 5.0 | 1.45 | 0.910 | 0.88 | 2046 | 1970 |
| Example | A7 | Mo | 0.1 | 1.56 | 0.961 | 0.95 | 2182 | 2115 |
| Example | A8 | | 5.0 | 1.45 | 0.910 | 0.89 | 2079 | 2000 |
| Example | A9 | In | 0.1 | 1.56 | 0.961 | 0.94 | 2185 | 2120 |
| Example | A10 | | 5.0 | 1.45 | 0.910 | 0.88 | 2046 | 2005 |
| Example | A11 | Sn | 0.1 | 1.56 | 0.961 | 0.94 | 2175 | 2111 |
| Example | A12 | | 5.0 | 1.45 | 0.910 | 0.88 | 2046 | 2000 |
| Example | A13 | Ti | 0.1 | 1.56 | 0.961 | 0.94 | 2170 | 2102 |
| Example | A14 | | 5.0 | 1.45 | 0.910 | 0.88 | 2080 | 2005 |
| Example | A15 | Zr | 0.1 | 1.56 | 0.961 | 0.95 | 2175 | 2105 |
| Example | A16 | | 5.0 | 1.45 | 0.910 | 0.89 | 2070 | 2008 |
| Example | A17 | W | 0.1 | 1.56 | 0.961 | 0.92 | 2180 | 2100 |
| Example | A18 | | 5.0 | 1.45 | 0.910 | 0.87 | 2012 | 1940 |

TABLE 1B

| Battery No. | | Added Element Me | Added amount (mol %) | Wp/Wn value | Upper limit value = $-0.013 \ln(z) + 0.871$ (Lower limit value = 0.85) | Value of x in end-of-discharge state | Intermittent cycle characteristics Capacity after 500 cycles Charge/discharge rest | |
|---|---|---|---|---|---|---|---|---|
| | | | | | | | 30 min. (mAh) | 720 min. (mAh) |
| Comp. Ex. | a1 | Nb | 6.0 | 1.40 | 0.908 | 0.82 | 1645 | 1200 |
| Comp. Ex. | a2 | Mn | | 1.40 | 0.908 | 0.83 | 1645 | 1201 |
| Comp. Ex. | a3 | Ta | | 1.40 | 0.908 | 0.82 | 1611 | 1202 |
| Comp. Ex. | a4 | Mo | | 1.40 | 0.908 | 0.82 | 1678 | 1220 |
| Comp. Ex. | a5 | In | | 1.40 | 0.908 | 0.84 | 1645 | 1210 |
| Comp. Ex. | a6 | Sn | | 1.40 | 0.908 | 0.83 | 1645 | 1200 |
| Comp. Ex. | a7 | Ti | | 1.40 | 0.908 | 0.84 | 1643 | 1205 |
| Comp. Ex. | a8 | Zr | | 1.40 | 0.908 | 0.82 | 1640 | 1200 |
| Comp. Ex. | a9 | W | | 1.40 | 0.908 | 0.81 | 1611 | 1205 |
| Comp. Ex. | a10 | Nb | 0.1 | 1.60 | 0.961 | 0.97 | 2248 | 1000 |
| Comp. Ex. | a11 | Mn | | 1.60 | 0.961 | 0.97 | 2280 | 1005 |
| Comp. Ex. | a12 | Ta | | 1.60 | 0.961 | 0.98 | 2250 | 1002 |
| Comp. Ex. | a13 | Mo | | 1.60 | 0.961 | 0.97 | 2250 | 1000 |
| Comp. Ex. | a14 | In | | 1.60 | 0.961 | 0.98 | 2244 | 1001 |
| Comp. Ex. | a15 | Sn | | 1.60 | 0.961 | 0.97 | 2280 | 1002 |
| Comp. Ex. | a16 | Ti | | 1.60 | 0.961 | 0.97 | 2254 | 1005 |
| Comp. Ex. | a17 | Zr | | 1.60 | 0.961 | 0.97 | 2250 | 1007 |
| Comp. Ex. | a18 | W | | 1.60 | 0.961 | 0.97 | 2245 | 1005 |
| Comp. Ex. | a19 | Nb | 0.1 | 1.37 | 0.931 | 0.82 | 1842 | 1720 |
| Comp. Ex. | a20 | Mn | | 1.37 | 0.931 | 0.84 | 1872 | 1772 |
| Comp. Ex. | a21 | Ta | | 1.37 | 0.931 | 0.82 | 1847 | 1754 |
| Comp. Ex. | a22 | Mo | | 1.37 | 0.931 | 0.82 | 1875 | 1771 |
| Comp. Ex. | a23 | In | | 1.37 | 0.931 | 0.84 | 1847 | 1745 |
| Comp. Ex. | a24 | Sn | | 1.37 | 0.931 | 0.83 | 1849 | 1749 |
| Comp. Ex. | a25 | Ti | | 1.37 | 0.931 | 0.82 | 1850 | 1750 |
| Comp. Ex. | a26 | Zr | | 1.37 | 0.931 | 0.82 | 1872 | 1752 |
| Comp. Ex. | a27 | W | | 1.37 | 0.931 | 0.81 | 1820 | 1727 |
| Comp. Ex. | a28 | Nb | 0.08 | 1.55 | 0.964 | 0.96 | 2314 | 1405 |
| Comp. Ex. | a29 | Mn | | 1.55 | 0.964 | 0.95 | 2281 | 1450 |
| Comp. Ex. | a30 | Ta | | 1.55 | 0.964 | 0.95 | 2281 | 1420 |
| Comp. Ex. | a31 | Mo | | 1.55 | 0.964 | 0.96 | 2314 | 1410 |
| Comp. Ex. | a32 | In | | 1.55 | 0.964 | 0.94 | 2247 | 1415 |
| Comp. Ex. | a33 | Sn | | 1.55 | 0.964 | 0.95 | 2281 | 1420 |
| Comp. Ex. | a34 | Ti | | 1.55 | 0.964 | 0.95 | 2257 | 1400 |
| Comp. Ex. | a35 | Zr | | 1.55 | 0.964 | 0.95 | 2271 | 1427 |
| Comp. Ex. | a36 | W | | 1.55 | 0.964 | 0.94 | 2247 | 1422 |
| Comp. Ex. | a37 | None | | 1.42 | — | 0.89 | 1075 | 999 |

Example Batteries B1 to B18

Nickel sulfate, cobalt sulfate and manganese sulfate were mixed such that the molar ratio of Ni atoms, Co atoms and Mn atoms was 80:15:5. This mixture in an amount of 3.2 kg was dissolved in 10 L of water to obtain a raw material solution. To the raw material solution, 400 g of sodium hydroxide was added and a precipitate was produced. The precipitate was sufficiently washed with water, and dried to obtain a coprecipitated hydroxide.

The obtained Ni—Co—Mn coprecipitated hydroxide in an amount of 3 kg was mixed with 784 g of lithium hydroxide, and the mixture was calcined at a synthesis temperature of 750° C. in an atmosphere with an oxygen partial pressure of 0.5 atm for 10 hours. As a result, a lithium composite oxide ($LiNi_{0.8}Cu_{0.15}Mn_{0.05}O_2$) having an average particle size of 12 μm and containing Co and Mn as the element M was obtained. Batteries B1 to B18 were produced in the same manner as Batteries A1 to A18, respectively, except that the obtained lithium composite oxide was used.

Comparative Batteries b1 to b9

Batteries b1 to b9 were produced in the same manner as Batteries B1, B3, B5, B7, B9, B11, B13, B15 and B17, except that the amounts of niobium chloride, manganese sulfate, pentaethoxy tantalum, disodium molybdate dehydrate, indium nitrate, tin sulfate, tetraethoxy titanium, zirconium tetrabutoxide and sodium tungstate were set to 6 mol % (z=0.06) relative to that of the lithium composite oxide ($LiNi_{0.80}Co_{0.15}Mn_{0.05}O_2$), and the wp/wn ratio was set to 1.40.

Comparative Batteries b10 to b18

Batteries b10 to b18 were produced in the same manner as Batteries B1, B3, B5, B7, B9, B11, B13, B15 and B17, except that the wp/wn ratio was set to 1.60.

Comparative Batteries b19 to b27

Batteries b19 to b27 were produced in the same manner as Batteries B1, B3, B5, B7, B9, B11, B13, B15 and B17, except that the wp/wn ratio was set to 1.37.

Comparative Batteries b28 to b36

Batteries b28 to b36 were produced in the same manner as Batteries B1, B3, B5, B7, B9, B11, B13, B15 and B17, except that the amounts of niobium chloride, manganese sulfate, pentaethoxy tantalum, disodium molybdate dihydrate, indium nitrate, tin sulfate, tetraethoxy titanium, zirconium tetrabutoxide and sodium tungstate were set to 0.08 mol % (z=0.0008) relative to that of the lithium composite oxide ($LiNi_{0.8}Co_{0.15}Mn_{0.05}O_2$), and the wp/wn ratio was set to 1.55.

Comparative Battery b37

Battery b37 was produced in the same manner as Battery A1, except that the same lithium composite oxide ($LiNi_{0.8}Cu_{0.15}Mn_{0.05}O_2$) as above was used as a positive electrode active material, the wp/wn ratio was set to 1.42, and the lithium content x in the lithium composite oxide in the end-of-discharge state was controlled to 0.89.

The value of $-0.013Ln(z)+0.871$, and the value of x that represents the lithium content in the lithium composite oxide in the end-of-discharge state when a constant current discharge was performed under conditions of an ambient temperature of 25° C., a current value of 1 hour rate (1C) and an end-of-discharge voltage of 2.5 V for Batteries B1 to B18 and Batteries b1 to b37 are shown in Tables 2A and 2B.

TABLE 2A

| Battery No. | | Added Element Me | amount (mol %) | Wp/Wn value | Upper limit value = $-0.013\,Ln(z)+0.871$ (Lower limit value = 0.85) | Value of x in end-of-discharge state | Intermittent cycle characteristics Capacity after 500 cycles Charge/discharge rest | |
|---|---|---|---|---|---|---|---|---|
| | | | | | | | 30 min. (mAh) | 720 min. (mAh) |
| Example | B1 | Nb | 0.1 | 1.56 | 0.961 | 0.94 | 2184 | 2077 |
| Example | B2 | | 5.0 | 1.45 | 0.910 | 0.89 | 2110 | 2090 |
| Example | B3 | Mn | 0.1 | 1.56 | 0.961 | 0.95 | 2147 | 2082 |
| Example | B4 | | 5.0 | 1.45 | 0.910 | 0.88 | 2075 | 2000 |
| Example | B5 | Ta | 0.1 | 1.56 | 0.961 | 0.94 | 2205 | 2081 |
| Example | B6 | | 5.0 | 1.45 | 0.910 | 0.90 | 2145 | 2088 |
| Example | B7 | Mo | 0.1 | 1.56 | 0.961 | 0.94 | 2184 | 2084 |
| Example | B8 | | 5.0 | 1.45 | 0.910 | 0.90 | 2140 | 2095 |
| Example | B9 | In | 0.1 | 1.56 | 0.961 | 0.94 | 2199 | 2087 |
| Example | B10 | | 5.0 | 1.45 | 0.910 | 0.90 | 2140 | 2092 |
| Example | B11 | Sn | 0.1 | 1.56 | 0.961 | 0.95 | 2188 | 2077 |
| Example | B12 | | 5.0 | 1.45 | 0.910 | 0.90 | 2142 | 2088 |
| Example | B13 | Ti | 0.1 | 1.56 | 0.961 | 0.95 | 2180 | 2091 |
| Example | B14 | | 5.0 | 1.45 | 0.910 | 0.90 | 2144 | 2071 |
| Example | B15 | Zr | 0.1 | 1.56 | 0.961 | 0.94 | 2182 | 2092 |
| Example | B16 | | 5.0 | 1.45 | 0.910 | 0.89 | 2144 | 2087 |
| Example | B17 | W | 0.1 | 1.56 | 0.961 | 0.93 | 2210 | 2087 |
| Example | B18 | | 5.0 | 1.45 | 0.910 | 0.90 | 2135 | 2089 |

TABLE 2B

| Battery No. | | Added Element Me | amount (mol %) | Wp/Wn value | Upper limit value = $-0.013\,Ln(z)+0.871$ (Lower limit value = 0.85) | Value of x in end-of-discharge state | Intermittent cycle characteristics Capacity after 500 cycles Charge/discharge rest | |
|---|---|---|---|---|---|---|---|---|
| | | | | | | | 30 min. (mAh) | 720 min. (mAh) |
| Comp. Ex. | b1 | Nb | 6.0 | 1.40 | 0.908 | 0.84 | 1644 | 1203 |
| Comp. Ex. | b2 | Mn | | 1.40 | 0.908 | 0.82 | 1643 | 1200 |
| Comp. Ex. | b3 | Ta | | 1.40 | 0.908 | 0.83 | 1640 | 1205 |
| Comp. Ex. | b4 | Mo | | 1.40 | 0.908 | 0.82 | 1657 | 1210 |

TABLE 2B-continued

| Battery No. | Added Element Me | Added amount (mol %) | Wp/Wn value | Upper limit value = $-0.013 \ln(z) + 0.871$ (Lower limit value = 0.85) | Value of x in end-of-discharge state | Intermittent cycle characteristics Capacity after 500 cycles Charge/discharge rest 30 min. (mAh) | 720 min. (mAh) |
|---|---|---|---|---|---|---|---|
| Comp. Ex. b5 | In | | 1.40 | 0.908 | 0.85 | 1666 | 1211 |
| Comp. Ex. b6 | Sn | | 1.40 | 0.908 | 0.82 | 1654 | 1209 |
| Comp. Ex. b7 | Ti | | 1.40 | 0.908 | 0.82 | 1665 | 1208 |
| Comp. Ex. b8 | Zr | | 1.40 | 0.908 | 0.85 | 1667 | 1205 |
| Comp. Ex. b9 | W | | 1.40 | 0.908 | 0.82 | 1620 | 1207 |
| Comp. Ex. b10 | Nb | 0.1 | 1.60 | 0.961 | 0.97 | 2248 | 1004 |
| Comp. Ex. b11 | Mn | | 1.60 | 0.961 | 0.97 | 2242 | 1000 |
| Comp. Ex. b12 | Ta | | 1.60 | 0.961 | 0.98 | 2288 | 1002 |
| Comp. Ex. b13 | Mo | | 1.60 | 0.961 | 0.97 | 2277 | 1006 |
| Comp. Ex. b14 | In | | 1.60 | 0.961 | 0.97 | 2271 | 1001 |
| Comp. Ex. b15 | Sn | | 1.60 | 0.961 | 0.98 | 2255 | 1007 |
| Comp. Ex. b16 | Ti | | 1.60 | 0.961 | 0.98 | 2278 | 1002 |
| Comp. Ex. b17 | Zr | | 1.60 | 0.961 | 0.97 | 2277 | 1004 |
| Comp. Ex. b18 | W | | 1.60 | 0.961 | 0.98 | 2248 | 1002 |
| Comp. Ex. b19 | Nb | 0.1 | 1.37 | 0.931 | 0.80 | 1817 | 1717 |
| Comp. Ex. b20 | Mn | | 1.37 | 0.931 | 0.81 | 1827 | 1722 |
| Comp. Ex. b21 | Ta | | 1.37 | 0.931 | 0.84 | 1832 | 1725 |
| Comp. Ex. b22 | Mo | | 1.37 | 0.931 | 0.81 | 1852 | 1740 |
| Comp. Ex. b23 | In | | 1.37 | 0.931 | 0.83 | 1847 | 1738 |
| Comp. Ex. b24 | Sn | | 1.37 | 0.931 | 0.82 | 1842 | 1724 |
| Comp. Ex. b25 | Ti | | 1.37 | 0.931 | 0.84 | 1842 | 1728 |
| Comp. Ex. b26 | Zr | | 1.37 | 0.931 | 0.82 | 1847 | 1724 |
| Comp. Ex. b27 | W | | 1.37 | 0.931 | 0.82 | 1835 | 1722 |
| Comp. Ex. b28 | Nb | 0.08 | 1.55 | 0.964 | 0.96 | 2320 | 1400 |
| Comp. Ex. b29 | Mn | | 1.55 | 0.964 | 0.96 | 2300 | 1409 |
| Comp. Ex. b30 | Ta | | 1.55 | 0.964 | 0.94 | 2290 | 1408 |
| Comp. Ex. b31 | Mo | | 1.55 | 0.964 | 0.95 | 2309 | 1400 |
| Comp. Ex. b32 | In | | 1.55 | 0.964 | 0.96 | 2288 | 1420 |
| Comp. Ex. b33 | Sn | | 1.55 | 0.964 | 0.95 | 2289 | 1432 |
| Comp. Ex. b34 | Ti | | 1.55 | 0.964 | 0.95 | 2288 | 1405 |
| Comp. Ex. b35 | Zr | | 1.55 | 0.964 | 0.96 | 2277 | 1402 |
| Comp. Ex. b36 | W | | 1.55 | 0.964 | 0.95 | 2299 | 1429 |
| Comp. Ex. b37 | None | | 1.42 | — | 0.89 | 2110 | 985 |

Example Batteries C1 TO C18

Nickel sulfate, cobalt sulfate and manganese sulfate were mixed such that the molar ratio of Ni atoms, Co atoms and Mn atoms was 34:33:33. This mixture in an amount of 3.2 kg was dissolved in 10 L of water to obtain a raw material solution. To the raw material solution, 400 g of sodium hydroxide was added and a precipitate was produced. The precipitate was sufficiently washed with water, and dried to obtain a coprecipitated hydroxide.

The obtained Ni—Co—Mn coprecipitated hydroxide in an amount of 3 kg was mixed with 784 g of lithium hydroxide, and the mixture was calcined at a synthesis temperature of 750° C. in an atmosphere with an oxygen partial pressure of 0.5 atm for 10 hours. As a result, a lithium composite oxide ($LiNi_{0.34}Co_{0.33}Mn_{0.33}O_2$) having an average particle size of 12 μm and containing Co and Mn as the element M was obtained. Batteries C1 to C18 were produced in the same manner as Batteries A1 to A18, respectively, except that the obtained lithium composite oxide was used.

Comparative Batteries c1 to c9

Batteries c1 to c9 were produced in the same manner as Batteries C1, C3, C5, C7, C9, C11, C13, C15 and C17, except that the amounts of niobium chloride, manganese sulfate, pentaethoxy tantalum, disodium molybdate dihydrate, indium nitrate, tin sulfate, tetraethoxy titanium, zirconium tetrabutoxide and sodium tungstate were set to 6 mol % (z=0.06) relative to that of the lithium composite oxide ($LiNi_{0.34}Co_{0.33}Mn_{0.33}O_2$), and the wp/wn ratio was set to 1.40.

Comparative Batteries c10 to c18

Batteries c10 to c18 were produced in the same manner as Batteries C1, C3, C5, C7, C9, C11, C13, C15 and C17, except that the wp/wn ratio was set to 1.60.

Comparative Batteries c19 to c27

Batteries c19 to c27 were produced in the same manner as Batteries C1, C3, C5, C7, C9, C11, C13, C15 and C17, except that the wp/wn ratio was set to 1.37.

Comparative Batteries c28 to c36

Batteries c28 to c36 were produced in the same manner as Batteries C1, C3, C5, C7, C9, C11, C13, C15 and C13, except that the amounts of niobium chloride, manganese sulfate, pentaethoxy tantalum, disodium molybdate dehydrate, indium nitrate, tin sulfate, tetraethoxy titanium, zirconium tetrabutoxide and sodium tungstate were set to 0.08 mol % (z=0.0008) relative to that of the lithium composite oxide ($LiNi_{0.34}Co_{0.33}Mn_{0.33}O_2$), and the wp/wn ratio was set to 1.55.

Example Battery c37

Battery c37 was produced in the same manner as Battery A1, except that the same lithium composite oxide ($LiNi_{0.34}Co_{0.33}Mn_{0.33}O_2$) as above was used as a positive electrode active material, the wp/wn ratio was set to 1.42, and the lithium content x in the lithium composite oxide in the end-of-discharge state was controlled to 0.88.

The value of $-0.013\ln(z)+0.871$, and the value of x that represents the lithium content in the lithium composite oxide in the end-of-discharge state when a constant current discharge was performed under conditions of an ambient temperature of 25° C., a current value of 1 hour rate (1C) and an end-of-discharge voltage of 2.5 V for Batteries C1 to C18 and Batteries c1 to c37 are shown in Tables 3A and 3B.

TABLE 3A

| Battery No. | | Added Element Me | amount (mol %) | Wp/Wn value | Upper limit value = −0.013 Ln(z) + 0.871 (Lower limit value = 0.85) | Value of x in end-of-discharge state | Intermittent cycle characteristics Capacity after 500 cycles Charge/discharge rest | |
|---|---|---|---|---|---|---|---|---|
| | | | | | | | 30 min. (mAh) | 720 min. (mAh) |
| Example | C1 | Nb | 0.1 | 1.56 | 0.961 | 0.94 | 1957 | 1867 |
| Example | C2 | | 5.0 | 1.45 | 0.910 | 0.89 | 1865 | 1840 |
| Example | C3 | Mn | 0.1 | 1.56 | 0.961 | 0.95 | 1955 | 1866 |
| Example | C4 | | 5.0 | 1.45 | 0.910 | 0.88 | 1840 | 1800 |
| Example | C5 | Ta | 0.1 | 1.56 | 0.961 | 0.94 | 1922 | 1862 |
| Example | C6 | | 5.0 | 1.45 | 0.910 | 0.90 | 1902 | 1864 |
| Example | C7 | Mo | 0.1 | 1.56 | 0.961 | 0.94 | 1905 | 1862 |
| Example | C8 | | 5.0 | 1.45 | 0.910 | 0.87 | 1799 | 1780 |
| Example | C9 | In | 0.1 | 1.56 | 0.961 | 0.94 | 1925 | 1867 |
| Example | C10 | | 5.0 | 1.45 | 0.910 | 0.88 | 1845 | 1865 |
| Example | C11 | Sn | 0.1 | 1.56 | 0.961 | 0.95 | 1897 | 1866 |
| Example | C12 | | 5.0 | 1.45 | 0.910 | 0.87 | 1815 | 1780 |
| Example | C13 | Ti | 0.1 | 1.56 | 0.961 | 0.94 | 1945 | 1855 |
| Example | C14 | | 5.0 | 1.45 | 0.910 | 0.88 | 1812 | 1780 |
| Example | C15 | Zr | 0.1 | 1.56 | 0.961 | 0.94 | 1955 | 1857 |
| Example | C16 | | 5.0 | 1.45 | 0.910 | 0.87 | 1811 | 1779 |
| Example | C17 | W | 0.1 | 1.56 | 0.961 | 0.94 | 1947 | 1869 |
| Example | C18 | | 5.0 | 1.45 | 0.910 | 0.90 | 1895 | 1866 |

TABLE 3B

| Battery No. | | Added Element Me | amount (mol %) | Wp/Wn value | Upper limit value = −0.013 Ln(z) + 0.871 (Lower limit value = 0.85) | Value of x in end-of-discharge state | Intermittent cycle characteristics Capacity after 500 cycles Charge/discharge rest | |
|---|---|---|---|---|---|---|---|---|
| | | | | | | | 30 min. (mAh) | 720 min. (mAh) |
| Comp. Ex. | c1 | Nb | 6.0 | 1.40 | 0.908 | 0.82 | 1440 | 1002 |
| Comp. Ex. | c2 | Mn | | 1.40 | 0.908 | 0.83 | 1450 | 1005 |
| Comp. Ex. | c3 | Ta | | 1.40 | 0.908 | 0.82 | 1440 | 1008 |
| Comp. Ex. | c4 | Mo | | 1.40 | 0.908 | 0.82 | 1444 | 1004 |
| Comp. Ex. | c5 | In | | 1.40 | 0.908 | 0.84 | 1445 | 1009 |
| Comp. Ex. | c6 | Sn | | 1.40 | 0.908 | 0.83 | 1449 | 1007 |
| Comp. Ex. | c7 | Ti | | 1.40 | 0.908 | 0.83 | 1447 | 1004 |
| Comp. Ex. | c8 | Zr | | 1.40 | 0.908 | 0.82 | 1444 | 1002 |
| Comp. Ex. | c9 | W | | 1.40 | 0.908 | 0.81 | 1454 | 1007 |
| Comp. Ex. | c10 | Nb | 0.1 | 1.60 | 0.961 | 0.97 | 2011 | 799 |
| Comp. Ex. | c11 | Mn | | 1.60 | 0.961 | 0.97 | 2018 | 800 |
| Comp. Ex. | c12 | Ta | | 1.60 | 0.961 | 0.98 | 2005 | 798 |
| Comp. Ex. | c13 | Mo | | 1.60 | 0.961 | 0.97 | 1988 | 797 |
| Comp. Ex. | c14 | In | | 1.60 | 0.961 | 0.97 | 1987 | 800 |
| Comp. Ex. | c15 | Sn | | 1.60 | 0.961 | 0.98 | 1977 | 802 |
| Comp. Ex. | c16 | Ti | | 1.60 | 0.961 | 0.97 | 1980 | 805 |
| Comp. Ex. | c17 | Zr | | 1.60 | 0.961 | 0.98 | 1985 | 804 |
| Comp. Ex. | c18 | W | | 1.60 | 0.961 | 0.97 | 1974 | 800 |
| Comp. Ex. | c19 | Nb | 0.1 | 1.37 | 0.931 | 0.82 | 1705 | 1477 |
| Comp. Ex. | c20 | Mn | | 1.37 | 0.931 | 0.84 | 1702 | 1472 |
| Comp. Ex. | c21 | Ta | | 1.37 | 0.931 | 0.81 | 1704 | 1776 |
| Comp. Ex. | c22 | Mo | | 1.37 | 0.931 | 0.84 | 1705 | 1458 |
| Comp. Ex. | c23 | In | | 1.37 | 0.931 | 0.84 | 1707 | 1467 |
| Comp. Ex. | c24 | Sn | | 1.37 | 0.931 | 0.82 | 1705 | 1458 |
| Comp. Ex. | c25 | Ti | | 1.37 | 0.931 | 0.83 | 1701 | 1462 |
| Comp. Ex. | c26 | Zr | | 1.37 | 0.931 | 0.84 | 1700 | 1469 |
| Comp. Ex. | c27 | W | | 1.37 | 0.931 | 0.81 | 1701 | 1450 |
| Comp. Ex. | c28 | Nb | 0.08 | 1.55 | 0.964 | 0.96 | 2088 | 1208 |
| Comp. Ex. | c29 | Mn | | 1.55 | 0.964 | 0.95 | 2088 | 1200 |
| Comp. Ex. | c30 | Ta | | 1.55 | 0.964 | 0.95 | 2085 | 1205 |
| Comp. Ex. | c31 | Mo | | 1.55 | 0.964 | 0.96 | 2087 | 1217 |
| Comp. Ex. | c32 | In | | 1.55 | 0.964 | 0.94 | 2080 | 1214 |
| Comp. Ex. | c33 | Sn | | 1.55 | 0.964 | 0.95 | 2079 | 1200 |
| Comp. Ex. | c34 | Ti | | 1.55 | 0.964 | 0.94 | 2077 | 1205 |
| Comp. Ex. | c35 | Zr | | 1.55 | 0.964 | 0.95 | 2080 | 1202 |
| Comp. Ex. | c36 | W | | 1.55 | 0.964 | 0.94 | 2075 | 1227 |
| Comp. Ex. | c37 | None | | 1.42 | — | 0.88 | 1910 | 800 |

Example Batteries D1 to D18

Nickel sulfate, cobalt sulfate and titanium nitrate were mixed such that the molar ratio of Ni atoms, Co atoms and Ti atoms was 80:15:5. This mixture in an amount of 3.2 kg was dissolved in 10 L of water to obtain a raw material solution. To the raw material solution, 400 g of sodium hydroxide was added and a precipitate was produced. The precipitate was sufficiently washed with water, and dried to obtain a coprecipitated hydroxide.

The obtained Ni—Co—Ti coprecipitated hydroxide in an amount of 3 kg was mixed with 784 g of lithium hydroxide, and the mixture was calcined at a synthesis temperature of 750° C. in an atmosphere with an oxygen partial pressure of 0.5 atm for 10 hours. As a result, a lithium composite oxide ($LiNi_{0.80}Co_{0.15}Ti_{0.05}O_2$) having an average particle size of 11 μm and containing Co and Ti as the element M was obtained. Batteries D1 to D18 were produced in the same manner as Batteries A1 to A18, respectively, except that the obtained lithium composite oxide was used.

Comparative Batteries d1 to d9

Batteries d1 to d9 were produced in the same manner as Batteries D1, D3, D5, D7, D9, D11, D13, D15 and D17, except that the amounts of niobium chloride, manganese sulfate, pentaethoxy tantalum, disodium molybdate dihydrate, indium nitrate, tin sulfate, tetraethoxy titanium, zirconium tetra-n-butoxide and sodium tungstate were set to 6 mol % (z=0.06) relative to that of the lithium composite oxide ($LiNi_{0.80}Co_{0.15}Ti_{0.05}O_2$), and the wp/wn ratio was set to 1.40.

Comparative Batteries d10 to d18

Batteries d10 to d18 were produced in the same manner as Batteries D1, D3, D5, D7, D9, D11, D13, D15 and D17, except that the wp/wn ratio was set to 1.60.

Comparative Batteries d19 to d27

Batteries d19 to d27 were produced in the same manner as Batteries D1, D3, D5, D7, D9, D11, D13, D15 and D17, except that the wp/wn ratio was set to 1.37.

Comparative Batteries d28 to d36

Batteries d28 to d36 were produced in the same manner as Batteries D1, D3, D5, D7, D9, D11, D13, D15 and D17, except that the amounts of niobium chloride, manganese sulfate, pentaethoxy tantalum, disodium molybdate dihydrate, indium nitrate, tin sulfate, tetraethoxy titanium, zirconium tetra-n-butoxide and sodium tungstate were set to 0.08 mol % (z=0.0008) relative to that of the lithium composite oxide ($LiNi_{0.80}Cu_{0.15}Ti_{0.05}O_2$), and the wp/wn ratio was set to 1.55.

Example Battery D37

Battery d37 was produced in the same manner as Battery A1, except that the same lithium composite oxide ($LiNi_{0.80}Co_{0.15}Ti_{0.05}O_2$) as above was used as a positive electrode active material, the wp/wn ratio was set to 1.42, and the lithium content x in the lithium composite oxide in the end-of-discharge state was controlled to 0.88.

The value of −0.013Ln(z)+0.871, and the value of x that represents the lithium content in the lithium composite oxide in the end-of-discharge state when a constant current discharge was performed under conditions of an ambient temperature of 25° C., a current value of 1 hour rate (1C) and an end-of-discharge voltage of 2.5 V for Batteries D1 to D18 and Batteries d1 to d37 are shown in Tables 4A and 4B.

TABLE 4A

| Battery No. | | Added Element Me | amount (mol %) | Wp/Wn value | Upper limit value = −0.013 Ln(z) + 0.871 (Lower limit value = 0.85) | Value of x in end-of-discharge state | Intermittent cycle characteristics Capacity after 500 cycles Charge/discharge rest | |
|---|---|---|---|---|---|---|---|---|
| | | | | | | | 30 min. (mAh) | 720 min. (mAh) |
| Example | D1 | Nb | 0.1 | 1.56 | 0.961 | 0.94 | 2172 | 2097 |
| Example | D2 | | 5.0 | 1.45 | 0.910 | 0.88 | 2032 | 2000 |
| Example | D3 | Mn | 0.1 | 1.56 | 0.961 | 0.95 | 2135 | 2090 |
| Example | D4 | | 5.0 | 1.45 | 0.910 | 0.87 | 2000 | 1990 |
| Example | D5 | Ta | 0.1 | 1.56 | 0.961 | 0.94 | 2107 | 2092 |
| Example | D6 | | 5.0 | 1.45 | 0.910 | 0.87 | 2005 | 1990 |
| Example | D7 | Mo | 0.1 | 1.56 | 0.961 | 0.93 | 2138 | 2097 |
| Example | D8 | | 5.0 | 1.45 | 0.910 | 0.90 | 2107 | 2000 |
| Example | D9 | In | 0.1 | 1.56 | 0.961 | 0.95 | 2112 | 2087 |
| Example | D10 | | 5.0 | 1.45 | 0.910 | 0.87 | 2002 | 1980 |
| Example | D11 | Sn | 0.1 | 1.56 | 0.961 | 0.93 | 2125 | 2080 |
| Example | D12 | | 5.0 | 1.45 | 0.910 | 0.85 | 1942 | 1900 |
| Example | D13 | Ti | 0.1 | 1.56 | 0.961 | 0.95 | 2197 | 2079 |
| Example | D14 | | 5.0 | 1.45 | 0.910 | 0.84 | 2033 | 2000 |
| Example | D15 | Zr | 0.1 | 1.56 | 0.961 | 0.94 | 2127 | 2077 |
| Example | D16 | | 5.0 | 1.45 | 0.910 | 0.82 | 2037 | 2001 |
| Example | D17 | W | 0.1 | 1.56 | 0.961 | 0.94 | 2104 | 2000 |
| Example | D18 | | 5.0 | 1.45 | 0.910 | 0.85 | 1969 | 1900 |

TABLE 4B

| Battery No. | Added Element Me | amount (mol %) | Wp/Wn value | Upper limit value = −0.013 Ln(z) + 0.871 (Lower limit value = 0.85) | Value of x in end-of-discharge state | Intermittent cycle characteristics Capacity after 500 cycles Charge/discharge rest | |
|---|---|---|---|---|---|---|---|
| | | | | | | 30 min. (mAh) | 720 min. (mAh) |
| Comp. Ex. d1 | Nb | 6.0 | 1.40 | 0.908 | 0.84 | 1633 | 1204 |
| Comp. Ex. d2 | Mn | | 1.40 | 0.908 | 0.82 | 1627 | 1200 |
| Comp. Ex. d3 | Ta | | 1.40 | 0.908 | 0.83 | 1622 | 1205 |

TABLE 4B-continued

| Battery No. | Added Element Me | Added amount (mol %) | Wp/Wn value | Upper limit value = −0.013 Ln(z) + 0.871 (Lower limit value = 0.85) | Value of x in end-of-discharge state | Intermittent cycle characteristics Capacity after 500 cycles Charge/discharge rest | |
|---|---|---|---|---|---|---|---|
| | | | | | | 30 min. (mAh) | 720 min. (mAh) |
| Comp. Ex. d4 | Mo | | 1.40 | 0.908 | 0.84 | 1625 | 1200 |
| Comp. Ex. d5 | In | | 1.40 | 0.908 | 0.84 | 1621 | 1207 |
| Comp. Ex. d6 | Sn | | 1.40 | 0.908 | 0.82 | 1635 | 1201 |
| Comp. Ex. d7 | Ti | | 1.40 | 0.908 | 0.84 | 1622 | 1202 |
| Comp. Ex. d8 | Zr | | 1.40 | 0.908 | 0.82 | 1630 | 1207 |
| Comp. Ex. d9 | W | | 1.40 | 0.908 | 0.84 | 1620 | 1208 |
| Comp. Ex. d10 | Nb | 0.1 | 1.60 | 0.961 | 0.97 | 2230 | 902 |
| Comp. Ex. d11 | Mn | | 1.60 | 0.961 | 0.98 | 2240 | 904 |
| Comp. Ex. d12 | Ta | | 1.60 | 0.961 | 0.97 | 2227 | 901 |
| Comp. Ex. d13 | Mo | | 1.60 | 0.961 | 0.97 | 2225 | 907 |
| Comp. Ex. d14 | In | | 1.60 | 0.961 | 0.98 | 2232 | 902 |
| Comp. Ex. d15 | Sn | | 1.60 | 0.961 | 0.97 | 2247 | 905 |
| Comp. Ex. d16 | Ti | | 1.60 | 0.961 | 0.97 | 2234 | 900 |
| Comp. Ex. d17 | Zr | | 1.60 | 0.961 | 0.97 | 2247 | 901 |
| Comp. Ex. d18 | W | | 1.60 | 0.961 | 0.97 | 2227 | 904 |
| Comp. Ex. d19 | Nb | 0.1 | 1.37 | 0.931 | 0.84 | 1817 | 1745 |
| Comp. Ex. d20 | Mn | | 1.37 | 0.931 | 0.82 | 1820 | 1747 |
| Comp. Ex. d21 | Ta | | 1.37 | 0.931 | 0.83 | 1825 | 1748 |
| Comp. Ex. d22 | Mo | | 1.37 | 0.931 | 0.83 | 1821 | 1750 |
| Comp. Ex. d23 | In | | 1.37 | 0.931 | 0.82 | 1819 | 1752 |
| Comp. Ex. d24 | Sn | | 1.37 | 0.931 | 0.82 | 1819 | 1754 |
| Comp. Ex. d25 | Ti | | 1.37 | 0.931 | 0.84 | 1824 | 1745 |
| Comp. Ex. d26 | Zr | | 1.37 | 0.931 | 0.83 | 1827 | 1748 |
| Comp. Ex. d27 | W | | 1.37 | 0.931 | 0.84 | 1825 | 1747 |
| Comp. Ex. d28 | Nb | 0.08 | 1.55 | 0.964 | 0.95 | 2270 | 1409 |
| Comp. Ex. d29 | Mn | | 1.55 | 0.964 | 0.93 | 2274 | 1408 |
| Comp. Ex. d30 | Ta | | 1.55 | 0.964 | 0.94 | 2280 | 1407 |
| Comp. Ex. d31 | Mo | | 1.55 | 0.964 | 0.94 | 2279 | 1400 |
| Comp. Ex. d32 | In | | 1.55 | 0.964 | 0.95 | 2282 | 1408 |
| Comp. Ex. d33 | Sn | | 1.55 | 0.964 | 0.92 | 2280 | 1409 |
| Comp. Ex. d34 | Ti | | 1.55 | 0.964 | 0.94 | 2281 | 1410 |
| Comp. Ex. d35 | Zr | | 1.55 | 0.964 | 0.92 | 2288 | 1407 |
| Comp. Ex. d36 | W | | 1.55 | 0.964 | 0.92 | 2270 | 1400 |
| Comp. Ex. d37 | None | | 1.42 | — | 0.88 | 2055 | 899 |

Example Batteries E1 to E18

Nickel sulfate and cobalt sulfate were mixed such that the molar ratio of Ni atoms and Co atoms was 75:25. This mixture in an amount of 3.2 kg was dissolved in 10 L of water to obtain a raw material solution. To the raw material solution, 400 g of sodium hydroxide was added and a precipitate was produced. The precipitate was sufficiently washed with water, and dried to obtain a coprecipitated hydroxide.

The obtained Ni—Co coprecipitated hydroxide in an amount of 3 kg was mixed with 784 g of lithium hydroxide, and the mixture was calcined at a synthesis temperature of 750° C. in an atmosphere with an oxygen partial pressure of 0.5 atm for 10 hours. As a result, a lithium composite oxide ($LiNi_{0.75}Co_{0.25}O_2$) having an average particle size of 12 μm and containing Co as the element M was obtained. Batteries E1 to E18 were produced in the same manner as Batteries A1 to A18, respectively, except that the obtained lithium composite oxide was used.

Comparative Batteries e1 to e9

Batteries e1 to e9 were produced in the same manner as Batteries E1, E3, E5, E7, E9, E11, E13, E15 and E17, except that the amounts of niobium chloride, manganese sulfate, pentaethoxy tantalum, disodium molybdate dehydrate, indium nitrate, tin sulfate, tetraethoxy titanium, zirconium tetra-n-butoxide and sodium tungstate were set to 6 mol % (z=0.06) relative to that of the lithium composite oxide ($LiNi_{0.75}Co_{0.25}O_2$), and the wp/wn ratio was set to 1.40.

Comparative Batteries e10 to e18

Batteries e10 to e18 were produced in the same manner as Batteries E1, E3, E5, E7, E9, E11, E13, E15 and E17, except that the wp/wn ratio was set to 1.60.

Comparative Batteries e19 to e27

Batteries e19 to e27 were produced in the same manner as Batteries E1, E3, E5, E7, E9, E11, E13, E15 and E17, except that the wp/wn ratio was set to 1.37.

Comparative Batteries e28 to e36

Batteries e28 to e36 were produced in the same manner as Batteries E1, E3, E5, E7, E9, E11, E13, E15 and E17, except that the amounts of niobium chloride, manganese sulfate, pentaethoxy tantalum, disodium molybdate dihydrate, indium nitrate, tin sulfate and sodium tungstate were set to 0.08 mol % (z=0.0008) relative to that of the lithium composite oxide ($LiNi_{0.75}Co_{0.25}O_2$), and the wp/wn ratio was set to 1.55.

Example Battery e37

Battery e37 was produced in the same manner as Battery A1, except that the same lithium composite oxide ($LiNi_{0.75}Co_{0.25}O_2$) as above was used as a positive electrode active material, the wp/wn ratio was set to 1.42, and the lithium content x in the lithium composite oxide in the end-of-discharge state was controlled to 0.87.

The value of −0.013Ln(z)+0.871, and the value of x that represents the lithium content in the lithium composite oxide in the end-of-discharge state when a constant current discharge was performed under conditions of an ambient temperature of 25° C., a current value of 1 hour rate (1C) and an end-of-discharge voltage of 2.5 V for Batteries E1 to E18 and Batteries e1 to e37 are shown in Tables 5A and 5B.

TABLE 5A

| Battery No. | | Added Element Me | amount (mol %) | Wp/Wn value | Upper limit value = −0.013 Ln(z) + 0.871 (Lower limit value = 0.85) | Value of x in end-of-discharge state | Intermittent cycle characteristics Capacity after 500 cycles Charge/discharge rest | |
|---|---|---|---|---|---|---|---|---|
| | | | | | | | 30 min. (mAh) | 720 min. (mAh) |
| Example | E1 | Nb | 0.1 | 1.56 | 0.961 | 0.94 | 2192 | 2105 |
| Example | E2 | | 5.0 | 1.45 | 0.910 | 0.88 | 2085 | 2000 |
| Example | E3 | Mn | 0.1 | 1.56 | 0.961 | 0.93 | 2167 | 2102 |
| Example | E4 | | 5.0 | 1.45 | 0.910 | 0.87 | 2055 | 2002 |
| Example | E5 | Ta | 0.1 | 1.56 | 0.961 | 0.94 | 2145 | 2105 |
| Example | E6 | | 5.0 | 1.45 | 0.910 | 0.85 | 1985 | 1960 |
| Example | E7 | Mo | 0.1 | 1.56 | 0.961 | 0.95 | 2175 | 2114 |
| Example | E8 | | 5.0 | 1.45 | 0.910 | 0.88 | 2099 | 1990 |
| Example | E9 | In | 0.1 | 1.56 | 0.961 | 0.94 | 2201 | 2087 |
| Example | E10 | | 5.0 | 1.45 | 0.910 | 0.85 | 2118 | 1980 |
| Example | E11 | Sn | 0.1 | 1.56 | 0.961 | 0.92 | 2178 | 2099 |
| Example | E12 | | 5.0 | 1.45 | 0.910 | 0.88 | 2088 | 1978 |
| Example | E13 | Ti | 0.1 | 1.56 | 0.961 | 0.94 | 2177 | 2107 |
| Example | E14 | | 5.0 | 1.45 | 0.910 | 0.87 | 2070 | 2000 |
| Example | E15 | Zr | 0.1 | 1.56 | 0.961 | 0.95 | 2157 | 2100 |
| Example | E16 | | 5.0 | 1.45 | 0.910 | 0.86 | 2067 | 2001 |
| Example | E17 | W | 0.1 | 1.56 | 0.961 | 0.94 | 2180 | 2095 |
| Example | E18 | | 5.0 | 1.45 | 0.910 | 0.90 | 2145 | 2100 |

TABLE 5B

| Battery No. | | Added Element Me | amount (mol %) | Wp/Wn value | Upper limit value = −0.013 Ln(z) + 0.871 (Lower limit value = 0.85) | Value of x in end-of-discharge state | Intermittent cycle characteristics Capacity after 500 cycles Charge/discharge rest | |
|---|---|---|---|---|---|---|---|---|
| | | | | | | | 30 min. (mAh) | 720 min. (mAh) |
| Comp. Ex. | e1 | Nb | 6.0 | 1.40 | 0.908 | 0.85 | 1655 | 1190 |
| Comp. Ex. | e2 | Mn | | 1.40 | 0.908 | 0.85 | 1650 | 1187 |
| Comp. Ex. | e3 | Ta | | 1.40 | 0.908 | 0.85 | 1657 | 1192 |
| Comp. Ex. | e4 | Mo | | 1.40 | 0.908 | 0.85 | 1652 | 1197 |
| Comp. Ex. | e5 | In | | 1.40 | 0.908 | 0.82 | 1654 | 1190 |
| Comp. Ex. | e6 | Sn | | 1.40 | 0.908 | 0.84 | 1650 | 1192 |
| Comp. Ex. | e7 | Ti | | 1.40 | 0.908 | 0.84 | 1651 | 1190 |
| Comp. Ex. | e8 | Zr | | 1.40 | 0.908 | 0.85 | 1652 | 1188 |
| Comp. Ex. | e9 | W | | 1.40 | 0.908 | 0.85 | 1648 | 1197 |
| Comp. Ex. | e10 | Nb | 0.1 | 1.60 | 0.961 | 0.97 | 2302 | 905 |
| Comp. Ex. | e11 | Mn | | 1.60 | 0.961 | 0.98 | 2289 | 902 |
| Comp. Ex. | e12 | Ta | | 1.60 | 0.961 | 0.98 | 2297 | 904 |
| Comp. Ex. | e13 | Mo | | 1.60 | 0.961 | 0.97 | 2278 | 905 |
| Comp. Ex. | e14 | In | | 1.60 | 0.961 | 0.97 | 2300 | 905 |
| Comp. Ex. | e15 | Sn | | 1.60 | 0.961 | 0.97 | 2295 | 905 |
| Comp. Ex. | e16 | Ti | | 1.60 | 0.961 | 0.98 | 2297 | 907 |
| Comp. Ex. | e17 | Zr | | 1.60 | 0.961 | 0.98 | 2299 | 907 |
| Comp. Ex. | e18 | W | | 1.60 | 0.961 | 0.98 | 2278 | 907 |
| Comp. Ex. | e19 | Nb | 0.1 | 1.37 | 0.931 | 0.82 | 1827 | 1705 |
| Comp. Ex. | e20 | Mn | | 1.37 | 0.931 | 0.81 | 1827 | 1702 |
| Comp. Ex. | e21 | Ta | | 1.37 | 0.931 | 0.83 | 1824 | 1707 |
| Comp. Ex. | e22 | Mo | | 1.37 | 0.931 | 0.83 | 1822 | 1702 |
| Comp. Ex. | e23 | In | | 1.37 | 0.931 | 0.84 | 1825 | 1705 |
| Comp. Ex. | e24 | Sn | | 1.37 | 0.931 | 0.84 | 1827 | 1702 |
| Comp. Ex. | e25 | Ti | | 1.37 | 0.931 | 0.81 | 1824 | 1705 |
| Comp. Ex. | e26 | Zr | | 1.37 | 0.931 | 0.82 | 1830 | 1708 |
| Comp. Ex. | e27 | W | | 1.37 | 0.931 | 0.84 | 1829 | 1701 |
| Comp. Ex. | e28 | Nb | 0.08 | 1.55 | 0.964 | 0.94 | 2308 | 1390 |
| Comp. Ex. | e29 | Mn | | 1.55 | 0.964 | 0.93 | 2307 | 1399 |
| Comp. Ex. | e30 | Ta | | 1.55 | 0.964 | 0.92 | 2306 | 1398 |
| Comp. Ex. | e31 | Mo | | 1.55 | 0.964 | 0.94 | 2309 | 1388 |
| Comp. Ex. | e32 | In | | 1.55 | 0.964 | 0.94 | 2300 | 1397 |
| Comp. Ex. | e33 | Sn | | 1.55 | 0.964 | 0.92 | 2304 | 1378 |
| Comp. Ex. | e34 | Ti | | 1.55 | 0.964 | 0.94 | 2300 | 1392 |
| Comp. Ex. | e35 | Zr | | 1.55 | 0.964 | 0.93 | 2302 | 1397 |
| Comp. Ex. | e36 | W | | 1.55 | 0.964 | 0.92 | 2300 | 1380 |
| Comp. Ex. | e37 | None | | 1.42 | — | 0.87 | 2050 | 900 |

Example Batteries F1 to F12

Nickel sulfate, cobalt sulfate and niobium nitrate were mixed such that the molar ratio of Ni atoms, Co atoms and Nb atoms was 80:15:5. This mixture in an amount of 3.2 kg was dissolved in 10 L of water to obtain a raw material solution. To the raw material solution, 400 g of sodium hydroxide was added and a precipitate was produced. The precipitate was sufficiently washed with water, and dried to obtain a coprecipitated hydroxide.

The obtained Ni—Co—Nb coprecipitated hydroxide in an amount of 3 kg was mixed with 784 g of lithium hydroxide, and the mixture was calcined at a synthesis temperature of 750° C. in an atmosphere with an oxygen partial pressure of 0.5 atm for 10 hours. As a result, a lithium composite oxide ($LiNi_{0.80}Cu_{0.15}Nb_{0.05}O_2$) having an average particle size of 12 μm and containing Co and Nb as the element M was obtained. Batteries F1 to F12 were produced in the same manner as Batteries A1 to A4, A7 to A8 and A13 to A18, except that the obtained lithium composite oxide was used.

Comparative Batteries f1 to f6

Batteries f1 to f6 were produced in the same manner as Batteries F1, F3, F5, F7, F9 and F11, except that the amounts of niobium chloride, manganese sulfate, disodium molybdate dihydrate, tetraethoxy titanium, zirconium tetra-n-butoxide and sodium tungstate were set to 6 mol % ($z=0.06$) relative to that of the lithium composite oxide ($LiNi_{0.80}Co_{0.15}Nb_{0.05}O_2$), and the wp/wn ratio was set to 1.40.

Comparative Batteries f7 to f12

Batteries f7 to f12 were produced in the same manner as Batteries F1, F3, F5, F7, F9 and F11, except that the wp/wn ratio was set to 1.60.

Comparative Batteries f13 to f18

Batteries f13 to f18 were produced in the same manner as Batteries F1, F3, F5, F7, F9 and F11, except that the wp/wn ratio was set to 1.37.

Comparative Batteries f19 to f24

Batteries f19 to f24 were produced in the same manner as Batteries F1, F3, F5, F7, F9 and F11, except that the amounts of niobium chloride, manganese sulfate, disodium molybdate dihydrate, tetraethoxy titanium, zirconium tetra-n-butoxide and sodium tungstate were set to 0.08 mol % ($z=0.0008$) relative to that of the lithium composite oxide ($LiNi_{0.80}Co_{0.15}Nb_{0.05}O_2$), and the wp/wn ratio was set to 1.55.

Example Battery f25

Battery f25 was produced in the same manner as Battery A1, except that the same lithium composite oxide ($LiNi_{0.80}Co_{0.15}Nb_{0.05}O_2$) as above was used as a positive electrode active material, the wp/wn ratio was set to 1.42, and the lithium content x in the lithium composite oxide in the end-of-discharge state was controlled to 0.88.

The value of $-0.013Ln(z)+0.871$, and the value of x that represents the lithium content in the lithium composite oxide in the end-of-discharge state when a constant current discharge was performed under conditions of an ambient temperature of 25° C., a current value of 1 hour rate (1C) and an end-of-discharge voltage of 2.5 V for Batteries F1 to F12 and Batteries f1 to f25 are shown in Tables 6A and 6B.

TABLE 6A

| Battery No. | | Element Me | Added amount (mol %) | Wp/Wn value | Upper limit value = $-0.013 \, Ln(z) + 0.871$ (Lower limit value = 0.85) | Value of x in end-of-discharge state | Intermittent cycle characteristics Capacity after 500 cycles Charge/discharge rest | |
|---|---|---|---|---|---|---|---|---|
| | | | | | | | 30 min. (mAh) | 720 min. (mAh) |
| Example | F1 | Nb | 0.1 | 1.56 | 0.961 | 0.95 | 2188 | 2102 |
| Example | F2 | | 5.0 | 1.45 | 0.910 | 0.88 | 2070 | 2004 |
| Example | F3 | Mn | 0.1 | 1.56 | 0.961 | 0.93 | 2166 | 2104 |
| Example | F4 | | 5.0 | 1.45 | 0.910 | 0.89 | 2072 | 2000 |
| Example | F5 | Mo | 0.1 | 1.56 | 0.961 | 0.94 | 2182 | 2111 |
| Example | F6 | | 5.0 | 1.45 | 0.910 | 0.88 | 2075 | 2010 |
| Example | F7 | Ti | 0.1 | 1.56 | 0.961 | 0.95 | 2179 | 2110 |
| Example | F8 | | 5.0 | 1.45 | 0.910 | 0.88 | 2057 | 2000 |
| Example | F9 | Zr | 0.1 | 1.56 | 0.961 | 0.94 | 2177 | 2109 |
| Example | F10 | | 5.0 | 1.45 | 0.910 | 0.89 | 2069 | 1997 |
| Example | F11 | W | 0.1 | 1.56 | 0.961 | 0.93 | 2180 | 2107 |
| Example | F12 | | 5.0 | 1.45 | 0.910 | 0.87 | 2075 | 1999 |

TABLE 6B

| Battery No. | | Element Me | Added amount (mol %) | Wp/Wn value | Upper limit value = $-0.013 \, Ln(z) + 0.871$ (Lower limit value = 0.85) | Value of x in end-of-discharge state | Intermittent cycle characteristics Capacity after 500 cycles Charge/discharge rest | |
|---|---|---|---|---|---|---|---|---|
| | | | | | | | 30 min. (mAh) | 720 min. (mAh) |
| Comp. Ex. | f1 | Nb | 6.0 | 1.40 | 0.908 | 0.84 | 1644 | 1201 |
| Comp. Ex. | f2 | Mn | | 1.40 | 0.908 | 0.82 | 1644 | 1205 |
| Comp. Ex. | f3 | Mo | | 1.40 | 0.908 | 0.83 | 1677 | 1205 |

TABLE 6B-continued

| Battery No. | Element Me | Added amount (mol %) | Wp/Wn value | Upper limit value = $-0.013 \text{Ln}(z) + 0.871$ (Lower limit value = 0.85) | Value of x in end-of-discharge state | Intermittent cycle characteristics Capacity after 500 cycles Charge/discharge rest | |
|---|---|---|---|---|---|---|---|
| | | | | | | 30 min. (mAh) | 720 min. (mAh) |
| Comp. Ex. f4 | Ti | | 1.40 | 0.908 | 0.83 | 1666 | 1208 |
| Comp. Ex. f5 | Zr | | 1.40 | 0.908 | 0.84 | 1658 | 1210 |
| Comp. Ex. f6 | W | | 1.40 | 0.908 | 0.82 | 1648 | 1204 |
| Comp. Ex. f7 | Nb | 0.1 | 1.60 | 0.961 | 0.98 | 2245 | 1002 |
| Comp. Ex. f8 | Mn | | 1.60 | 0.961 | 0.98 | 2271 | 1004 |
| Comp. Ex. f9 | Mo | | 1.60 | 0.961 | 0.98 | 2255 | 1007 |
| Comp. Ex. f10 | Ti | | 1.60 | 0.961 | 0.97 | 2257 | 1010 |
| Comp. Ex. f11 | Zr | | 1.60 | 0.961 | 0.97 | 2243 | 1004 |
| Comp. Ex. f12 | W | | 1.60 | 0.961 | 0.97 | 2247 | 1007 |
| Comp. Ex. f13 | Nb | 0.1 | 1.37 | 0.931 | 0.80 | 1778 | 1680 |
| Comp. Ex. f14 | Mn | | 1.37 | 0.931 | 0.84 | 1878 | 1780 |
| Comp. Ex. f15 | Mo | | 1.37 | 0.931 | 0.83 | 1878 | 1770 |
| Comp. Ex. f16 | Ti | | 1.37 | 0.931 | 0.81 | 1880 | 1750 |
| Comp. Ex. f17 | Zr | | 1.37 | 0.931 | 0.82 | 1840 | 1742 |
| Comp. Ex. f18 | W | | 1.37 | 0.931 | 0.82 | 1811 | 1710 |
| Comp. Ex. f19 | Nb | 0.08 | 1.55 | 0.964 | 0.94 | 2300 | 1402 |
| Comp. Ex. f20 | Mn | | 1.55 | 0.964 | 0.95 | 2301 | 1400 |
| Comp. Ex. f21 | Mo | | 1.55 | 0.964 | 0.94 | 2305 | 1415 |
| Comp. Ex. f22 | Ti | | 1.55 | 0.964 | 0.95 | 2304 | 1417 |
| Comp. Ex. f23 | Zr | | 1.55 | 0.964 | 0.95 | 2306 | 1427 |
| Comp. Ex. f24 | W | | 1.55 | 0.964 | 0.95 | 2300 | 1411 |
| Comp. Ex. f25 | | None | 1.42 | — | 0.88 | 1074 | 989 |

Example Batteries G1 to G12

Nickel sulfate and cobalt sulfate were mixed such that the molar ratio of Ni atoms and Co atoms was 80:15. This mixture in an amount of 3.2 kg was dissolved in 10 L of water to obtain a raw material solution. To the raw material solution, 400 g of sodium hydroxide was added and a precipitate was produced. The precipitate was sufficiently washed with water, and dried to obtain a coprecipitated hydroxide.

The obtained Ni—Co coprecipitated hydroxide was mixed with sodium tungstate such that the molar ratio of Ni atoms, Co atoms and W atoms was 80:15:5. This mixture in an amount of 3 kg was mixed with 784 g of lithium hydroxide, and the mixture was calcined at a synthesis temperature of 750° C. in an atmosphere with an oxygen partial pressure of 0.5 atm for 10 hours. As a result, a lithium composite oxide ($LiNi_{0.80}Co_{0.15}W_{0.05}O_2$) having an average particle size of 12 μm and containing Co and W as the element M was obtained. Batteries G1 to G12 were produced in the same manner as Batteries A1 to A4, A7 to A8 and A13 to A18, respectively, except that the obtained lithium composite oxide was used.

Comparative Batteries g1 to g6

Batteries g1 to g6 were produced in the same manner as Batteries G1, G3, G5, G7, G9 and G11, except that the amounts of niobium chloride, manganese sulfate, disodium molybdate dihydrate, tetraethoxy titanium, zirconium tetra-n-butoxide and sodium tungstate were set to 6 mol % (z=0.06) relative to that of the lithium composite oxide ($LiNi_{0.80}Co_{0.15}W_{0.05}O_2$), and the wp/wn ratio was set to 1.40.

Comparative Batteries g7 to g12

Batteries g7 to g12 were produced in the same manner as Batteries G1, G3, G5, G7, G9 and G11, except that the wp/wn ratio was set to 1.60.

Comparative Batteries g13 to g18

Batteries g13 to g18 were produced in the same manner as Batteries G1, G3, G5, G7, G9 and G11, except that the wp/wn ratio was set to 1.37.

Comparative Batteries g19 to g24

Batteries g19 to g24 were produced in the same manner as Batteries G1, G3, G5, G7, G9 and G11, except that the amounts of niobium chloride, manganese sulfate, disodium molybdate dihydrate, tetraethoxy titanium, zirconium tetra-n-butoxide and sodium tungstate were set to 0.08 mol % (z=0.0008) relative to that of the lithium composite oxide ($LiNi_{0.80}Co_{0.15}W_{0.05}O_2$), and the wp/wn ratio was set to 1.55.

Example Battery g25

Battery g25 was produced in the same manner as Battery A1, except that the same lithium composite oxide ($LiNi_{0.80}Co_{0.15}W_{0.05}O_2$) as above was used as a positive electrode active material, the wp/wn ratio was set to 1.42, and the lithium content x in the lithium composite oxide in the end-of-discharge state was controlled to 0.89.

The value of $-0.013\text{Ln}(z)+0.871$, and the value of x that represents the lithium content in the lithium composite oxide in the end-of-discharge state when a constant current discharge was performed under conditions of an ambient temperature of 25° C., a current value of 1 hour rate (1C) and an end-of-discharge voltage of 2.5 V for Batteries G1 to G12 and Batteries g1 to g25 are shown in Tables 7A and 7B.

TABLE 7A

| Battery No. | | Element Me | Added amount (mol %) | Wp/Wn value | Upper limit value = −0.013 Ln(z) + 0.871 (Lower limit value = 0.85) | Value of x in end-of-discharge state | Intermittent cycle characteristics Capacity after 500 cycles Charge/discharge rest | |
|---|---|---|---|---|---|---|---|---|
| | | | | | | | 30 min. (mAh) | 720 min. (mAh) |
| Example | G1 | Nb | 0.1 | 1.56 | 0.961 | 0.95 | 2188 | 2100 |
| Example | G2 | | 5.0 | 1.45 | 0.910 | 0.87 | 2080 | 2005 |
| Example | G3 | Mn | 0.1 | 1.56 | 0.961 | 0.94 | 2174 | 2105 |
| Example | G4 | | 5.0 | 1.45 | 0.910 | 0.89 | 2082 | 2007 |
| Example | G5 | Mo | 0.1 | 1.56 | 0.961 | 0.95 | 2175 | 2107 |
| Example | G6 | | 5.0 | 1.45 | 0.910 | 0.90 | 2085 | 2008 |
| Example | G7 | Ti | 0.1 | 1.56 | 0.961 | 0.93 | 2182 | 2100 |
| Example | G8 | | 5.0 | 1.45 | 0.910 | 0.82 | 2066 | 2000 |
| Example | G9 | Zr | 0.1 | 1.56 | 0.961 | 0.94 | 2177 | 2110 |
| Example | G10 | | 5.0 | 1.45 | 0.910 | 0.87 | 2050 | 1997 |
| Example | G11 | W | 0.1 | 1.56 | 0.961 | 0.95 | 2180 | 2107 |
| Example | G12 | | 5.0 | 1.45 | 0.910 | 0.90 | 2084 | 2010 |

TABLE 7B

| Battery No. | | Element Me | Added amount (mol %) | Wp/Wn value | Upper limit value = −0.013 Ln(z) + 0.871 (Lower limit value = 0.85) | Value of x in end-of-discharge state | Intermittent cycle characteristics Capacity after 500 cycles Charge/discharge rest | |
|---|---|---|---|---|---|---|---|---|
| | | | | | | | 30 min. (mAh) | 720 min. (mAh) |
| Comp. Ex. | g1 | Nb | 6.0 | 1.40 | 0.908 | 0.84 | 1680 | 1222 |
| Comp. Ex. | g2 | Mn | | 1.40 | 0.908 | 0.84 | 1682 | 1225 |
| Comp. Ex. | g3 | Mo | | 1.40 | 0.908 | 0.83 | 1685 | 1224 |
| Comp. Ex. | g4 | Ti | | 1.40 | 0.908 | 0.83 | 1684 | 1223 |
| Comp. Ex. | g5 | Zr | | 1.40 | 0.908 | 0.82 | 1683 | 1221 |
| Comp. Ex. | g6 | W | | 1.40 | 0.908 | 0.82 | 1682 | 1222 |
| Comp. Ex. | g7 | Nb | 0.1 | 1.60 | 0.961 | 0.98 | 2257 | 1001 |
| Comp. Ex. | g8 | Mn | | 1.60 | 0.961 | 0.97 | 2271 | 1002 |
| Comp. Ex. | g9 | Mo | | 1.60 | 0.961 | 0.97 | 2255 | 1005 |
| Comp. Ex. | g10 | Ti | | 1.60 | 0.961 | 0.98 | 2267 | 1008 |
| Comp. Ex. | g11 | Zr | | 1.60 | 0.961 | 0.98 | 2277 | 1004 |
| Comp. Ex. | g12 | W | | 1.60 | 0.961 | 0.97 | 2257 | 1008 |
| Comp. Ex. | g13 | Nb | 0.1 | 1.37 | 0.931 | 0.81 | 1800 | 1750 |
| Comp. Ex. | g14 | Mn | | 1.37 | 0.931 | 0.82 | 1850 | 1768 |
| Comp. Ex. | g15 | Mo | | 1.37 | 0.931 | 0.84 | 1848 | 1755 |
| Comp. Ex. | g16 | Ti | | 1.37 | 0.931 | 0.82 | 1846 | 1770 |
| Comp. Ex. | g17 | Zr | | 1.37 | 0.931 | 0.83 | 1844 | 1722 |
| Comp. Ex. | g18 | W | | 1.37 | 0.931 | 0.82 | 1852 | 1747 |
| Comp. Ex. | g19 | Nb | 0.08 | 1.55 | 0.964 | 0.94 | 2302 | 1435 |
| Comp. Ex. | g20 | Mn | | 1.55 | 0.964 | 0.96 | 2305 | 1437 |
| Comp. Ex. | g21 | Mo | | 1.55 | 0.964 | 0.96 | 2304 | 1433 |
| Comp. Ex. | g22 | Ti | | 1.55 | 0.964 | 0.94 | 2305 | 1435 |
| Comp. Ex. | g23 | Zr | | 1.55 | 0.964 | 0.95 | 2304 | 1437 |
| Comp. Ex. | g24 | W | | 1.55 | 0.964 | 0.95 | 2304 | 1432 |
| Comp. Ex. | g25 | None | | 1.42 | — | 0.89 | 1002 | 950 |

Example Batteries H1 to H12

Nickel sulfate and cobalt sulfate were mixed such that the molar ratio of Ni atoms and Co atoms was 80:15. This mixture in an amount of 3.2 kg was dissolved in 10 L of water to obtain a raw material solution. To the raw material solution, 400 g of sodium hydroxide was added and a precipitate was produced. The precipitate was sufficiently washed with water, and dried to obtain a coprecipitated hydroxide.

The obtained Ni—Co coprecipitated hydroxide was mixed with disodium molybdate such that the molar ratio of Ni atoms, Co atoms and Mo atoms was 80:15:5. This mixture in an amount of 3 kg was mixed with 784 g of lithium hydroxide, and the mixture was calcined at a synthesis temperature of 750° C. in an atmosphere with an oxygen partial pressure of 0.5 atm for 10 hours. As a result, a lithium composite oxide ($LiNi_{0.80}Co_{0.15}Mo_{0.05}O_2$) having an average particle size of 12 μm and containing Co and Mo as the element M was obtained. Batteries H1 to H12 were produced in the same manner as Batteries A1 to A4, A7 to A8 and A13 to A18, respectively, except that the obtained lithium composite oxide was used.

Comparative Batteries h1 to h6

Batteries h1 to h6 were produced in the same manner as Batteries H1, H3, H5, H7, H9 and H11, except that the amounts of niobium chloride, manganese sulfate, disodium molybdate dihydrate, tetraethoxy titanium, zirconium tetran-butoxide and sodium tungstate were set to 6 mol % (z=0.06) relative to that of the lithium composite oxide (LiNi$_{0.80}$Cu$_{0.15}$Mo$_{0.05}$O$_2$), and the wp/wn ratio was set to 1.40.

Comparative Batteries h7 to h12

Batteries h7 to h12 were produced in the same manner as Batteries H1, H3, H5, H7, H9 and H11, except that the wp/wn ratio was set to 1.60.

Comparative Batteries h13 to h18

Batteries h13 to h18 were produced in the same manner as Batteries H1, H3, H5, H7, H9 and H11, except that the wp/wn ratio was set to 1.37.

Comparative Batteries h19 to h24

Batteries h19 to h24 were produced in the same manner as Batteries H1, H3, H5, H7, H9 and H11, except that the amounts of niobium chloride, manganese sulfate, disodium molybdate dihydrate, tetraethoxy titanium, zirconium tetra-n-butoxide and sodium tungstate were set to 0.08 mol % (z=0.0008) relative to that of the lithium composite oxide (LiNi$_{0.80}$Co$_{0.15}$Mo$_{0.05}$O$_2$), and the wp/wn ratio was set to 1.55.

Example Battery h25

Battery h25 was produced in the same manner as Battery A1, except that the same lithium composite oxide (LiNi$_{0.80}$Co$_{0.15}$Mo$_{0.05}$O$_2$) as above was used as a positive electrode active material, the wp/wn ratio was set to 1.42, and the lithium content x in the lithium composite oxide in the end-of-discharge state was controlled to 0.90.

The value of −0.013Ln(z)+0.871, and the value of x that represents the lithium content in the lithium composite oxide in the end-of-discharge state when a constant current discharge was performed under conditions of an ambient temperature of 25° C., a current value of 1 hour rate (1C) and an end-of-discharge voltage of 2.5 V for Batteries H1 to H12 and Batteries h1 to h25 are shown in Tables 8A and 8B.

TABLE 8A

| Battery No. | | Element Me | Added amount (mol %) | Wp/Wn value | Upper limit value = −0.013 Ln(z) + 0.871 (Lower limit value = 0.85) | Value of x in end-of-discharge state | Intermittent cycle characteristics Capacity after 500 cycles Charge/discharge rest | |
|---|---|---|---|---|---|---|---|---|
| | | | | | | | 30 min. (mAh) | 720 min. (mAh) |
| Example | H1 | Nb | 0.1 | 1.56 | 0.961 | 0.94 | 2170 | 2105 |
| Example | H2 | | 5.0 | 1.45 | 0.910 | 0.87 | 2070 | 2004 |
| Example | H3 | Mn | 0.1 | 1.56 | 0.961 | 0.93 | 2172 | 2107 |
| Example | H4 | | 5.0 | 1.45 | 0.910 | 0.88 | 2071 | 2002 |
| Example | H5 | Mo | 0.1 | 1.56 | 0.961 | 0.94 | 2177 | 2115 |
| Example | H6 | | 5.0 | 1.45 | 0.910 | 0.88 | 2075 | 2002 |
| Example | H7 | Ti | 0.1 | 1.56 | 0.961 | 0.94 | 2164 | 2112 |
| Example | H8 | | 5.0 | 1.45 | 0.910 | 0.87 | 2047 | 2001 |
| Example | H9 | Zr | 0.1 | 1.56 | 0.961 | 0.95 | 2155 | 2110 |
| Example | H10 | | 5.0 | 1.45 | 0.910 | 0.84 | 2080 | 2000 |
| Example | H11 | W | 0.1 | 1.56 | 0.961 | 0.95 | 2172 | 2109 |
| Example | H12 | | 5.0 | 1.45 | 0.910 | 0.89 | 2080 | 2000 |

TABLE 8B

| Battery No. | | Element Me | Added amount (mol %) | Wp/Wn value | Upper limit value = −0.013 Ln(z) + 0.871 (Lower limit value = 0.85) | Value of x in end-of-discharge state | Intermittent cycle characteristics Capacity after 500 cycles Charge/discharge rest | |
|---|---|---|---|---|---|---|---|---|
| | | | | | | | 30 min. (mAh) | 720 min. (mAh) |
| Comp. Ex. | h1 | Nb | 6.0 | 1.40 | 0.908 | 0.84 | 1675 | 1205 |
| Comp. Ex. | h2 | Mn | | 1.40 | 0.908 | 0.82 | 1677 | 1210 |
| Comp. Ex. | h3 | Mo | | 1.40 | 0.908 | 0.84 | 1672 | 1212 |
| Comp. Ex. | h4 | Ti | | 1.40 | 0.908 | 0.83 | 1670 | 1218 |
| Comp. Ex. | h5 | Zr | | 1.40 | 0.908 | 0.82 | 1674 | 1217 |
| Comp. Ex. | h6 | W | | 1.40 | 0.908 | 0.83 | 1669 | 1217 |
| Comp. Ex. | h7 | Nb | 0.1 | 1.60 | 0.961 | 0.97 | 2267 | 1000 |
| Comp. Ex. | h8 | Mn | | 1.60 | 0.961 | 0.97 | 2270 | 1005 |
| Comp. Ex. | h9 | Mo | | 1.60 | 0.961 | 0.98 | 2258 | 1008 |
| Comp. Ex. | h10 | Ti | | 1.60 | 0.961 | 0.98 | 2254 | 1007 |
| Comp. Ex. | h11 | Zr | | 1.60 | 0.961 | 0.97 | 2264 | 1000 |
| Comp. Ex. | h12 | W | | 1.60 | 0.961 | 0.97 | 2271 | 1004 |
| Comp. Ex. | h13 | Nb | 0.1 | 1.37 | 0.931 | 0.81 | 1852 | 1771 |
| Comp. Ex. | h14 | Mn | | 1.37 | 0.931 | 0.81 | 1857 | 1775 |
| Comp. Ex. | h15 | Mo | | 1.37 | 0.931 | 0.82 | 1851 | 1768 |
| Comp. Ex. | h16 | Ti | | 1.37 | 0.931 | 0.83 | 1860 | 1762 |
| Comp. Ex. | h17 | Zr | | 1.37 | 0.931 | 0.82 | 1867 | 1759 |
| Comp. Ex. | h18 | W | | 1.37 | 0.931 | 0.82 | 1848 | 1770 |

TABLE 8B-continued

| Battery No. | Element Me | Added amount (mol %) | Wp/Wn value | Upper limit value = −0.013 Ln(z) + 0.871 (Lower limit value = 0.85) | Value of x in end-of-discharge state | Intermittent cycle characteristics Capacity after 500 cycles Charge/discharge rest | |
|---|---|---|---|---|---|---|---|
| | | | | | | 30 min. (mAh) | 720 min. (mAh) |
| Comp. Ex. h19 | Nb | 0.08 | 1.55 | 0.964 | 0.95 | 2300 | 1399 |
| Comp. Ex. h20 | Mn | | 1.55 | 0.964 | 0.95 | 2304 | 1389 |
| Comp. Ex. h21 | Mo | | 1.55 | 0.964 | 0.95 | 2305 | 1397 |
| Comp. Ex. h22 | Ti | | 1.55 | 0.964 | 0.94 | 2308 | 1390 |
| Comp. Ex. h23 | Zr | | 1.55 | 0.964 | 0.92 | 2300 | 1398 |
| Comp. Ex. h24 | W | | 1.55 | 0.964 | 0.94 | 2300 | 1375 |
| Comp. Ex. h25 | | None | 1.42 | — | 0.90 | 1050 | 987 |

Example Batteries I1 to I12

Nickel sulfate, cobalt sulfate and tin sulfate were mixed such that the molar ratio of Ni atoms, Co atoms and Sn atoms was 80:15:5. This mixture in an amount of 3.2 kg was dissolved in 10 L of water to obtain a raw material solution. To the raw material solution, 400 g of sodium hydroxide was added and a precipitate was produced. The precipitate was sufficiently washed with water, and dried to obtain a coprecipitated hydroxide.

The obtained Ni—Co—Sn coprecipitated hydroxide in an amount of 3 kg was mixed with 784 g of lithium hydroxide, and the mixture was calcined at a synthesis temperature of 750° C. in an atmosphere with an oxygen partial pressure of 0.5 atm for 10 hours. As a result, a lithium composite oxide ($LiNi_{0.80}Co_{0.15}Sn_{0.05}O_2$) having an average particle size of 12 μm and containing Co and Sn as the element M was obtained. Batteries I1 to I12 were produced in the same manner as Batteries A1 to A4, A7 to A8 and A13 to A18, respectively, except that the obtained lithium composite oxide was used.

Comparative Batteries i1 to i6

Batteries i1 to i6 were produced in the same manner as Batteries I1, I3, I5, I7, I9 and I11, except that the amounts of niobium chloride, manganese sulfate, disodium molybdate dihydrate, tetraethoxy titanium, zirconium tetra-n-butoxide and sodium tungstate were set to 6 mol % (z=0.06) relative to that of the lithium composite oxide ($LiNi_{0.80}Co_{0.15}Sn_{0.05}O_2$), and the wp/wn ratio was set to 1.40.

Comparative Batteries i7 to i12

Batteries i7 to i12 were produced in the same manner as Batteries I1, I3, I5, I7, I9 and I11, except that the wp/wn ratio was set to 1.60.

Comparative Batteries i13 to i18

Batteries i13 to i18 were produced in the same manner as Batteries I1, I3, I5, I7, I9 and I11, except that the wp/wn ratio was set to 1.37.

Comparative Batteries i19 to i24

Batteries i19 to i24 were produced in the same manner as Batteries I1, I3, I5, I7, I9 and I11, except that the amounts of niobium chloride, manganese sulfate, disodium molybdate dihydrate, tetraethoxy titanium, zirconium tetra-n-butoxide and sodium tungstate were set to 0.08 mol % (z=0.0008) relative to that of the lithium composite oxide ($LiNi_{0.80}Co_{0.15}Sn_{0.05}O_2$), and the wp/wn ratio was set to 1.55.

Example Battery i25

Battery i25 was produced in the same manner as Battery A1, except that the same lithium composite oxide ($LiNi_{0.80}Cu_{0.15}Sn_{0.05}O_2$) as above was used as a positive electrode active material, the wp/wn ratio was set to 1.42, and the lithium content x in the lithium composite oxide in the end-of-discharge state was controlled to 0.90.

The value of −0.013Ln(z)+0.871, and the value of x that represents the lithium content in the lithium composite oxide in the end-of-discharge state when a constant current discharge was performed under conditions of an ambient temperature of 25° C., a current value of 1 hour rate (1C) and an end-of-discharge voltage of 2.5 V for Batteries I1 to I12 and Batteries i1 to i25 are shown in Tables 9A and 9B.

TABLE 9A

| Battery No. | Element Me | Added amount (mol %) | Wp/Wn value | Upper limit value = −0.013 Ln(z) + 0.871 (Lower limit value = 0.85) | Value of x in end-of-discharge state | Intermittent cycle characteristics Capacity after 500 cycles Charge/discharge rest | |
|---|---|---|---|---|---|---|---|
| | | | | | | 30 min. (mAh) | 720 min. (mAh) |
| Example I1 | Nb | 0.1 | 1.56 | 0.961 | 0.93 | 2185 | 2100 |
| Example I2 | | 5.0 | 1.45 | 0.910 | 0.87 | 2080 | 2004 |
| Example I3 | Mn | 0.1 | 1.56 | 0.961 | 0.94 | 2167 | 2103 |
| Example I4 | | 5.0 | 1.45 | 0.910 | 0.88 | 2078 | 2001 |
| Example I5 | Mo | 0.1 | 1.56 | 0.961 | 0.95 | 2180 | 2109 |
| Example I6 | | 5.0 | 1.45 | 0.910 | 0.88 | 2082 | 2005 |
| Example I7 | Ti | 0.1 | 1.56 | 0.961 | 0.94 | 2175 | 2111 |
| Example I8 | | 5.0 | 1.45 | 0.910 | 0.85 | 2055 | 1999 |
| Example I9 | Zr | 0.1 | 1.56 | 0.961 | 0.94 | 2172 | 2105 |
| Example I10 | | 5.0 | 1.45 | 0.910 | 0.87 | 2067 | 1999 |

TABLE 9A-continued

| Battery No. | Element Me | Added amount (mol %) | Wp/Wn value | Upper limit value = −0.013 Ln(z) + 0.871 (Lower limit value = 0.85) | Value of x in end-of-discharge state | Intermittent cycle characteristics Capacity after 500 cycles Charge/discharge rest 30 min. (mAh) | 720 min. (mAh) |
|---|---|---|---|---|---|---|---|
| Example I11 | W | 0.1 | 1.56 | 0.961 | 0.95 | 2181 | 2108 |
| Example I12 |   | 5.0 | 1.45 | 0.910 | 0.85 | 2078 | 1950 |

TABLE 9B

| Battery No. | Element Me | Added amount (mol %) | Wp/Wn value | Upper limit value = −0.013 Ln(z) + 0.871 (Lower limit value = 0.85) | Value of x in end-of-discharge state | Intermittent cycle characteristics Capacity after 500 cycles Charge/discharge rest 30 min. (mAh) | 720 min. (mAh) |
|---|---|---|---|---|---|---|---|
| Comp. Ex. i1 | Nb | 6.0 | 1.40 | 0.908 | 0.81 | 1644 | 1199 |
| Comp. Ex. i2 | Mn |   | 1.40 | 0.908 | 0.82 | 1648 | 1198 |
| Comp. Ex. i3 | Mo |   | 1.40 | 0.908 | 0.84 | 1642 | 1204 |
| Comp. Ex. i4 | Ti |   | 1.40 | 0.908 | 0.83 | 1647 | 1200 |
| Comp. Ex. i5 | Zr |   | 1.40 | 0.908 | 0.84 | 1650 | 1199 |
| Comp. Ex. i6 | W |   | 1.40 | 0.908 | 0.83 | 1657 | 1201 |
| Comp. Ex. i7 | Nb | 0.1 | 1.60 | 0.961 | 0.97 | 2242 | 1000 |
| Comp. Ex. i8 | Mn |   | 1.60 | 0.961 | 0.97 | 2270 | 1003 |
| Comp. Ex. i9 | Mo |   | 1.60 | 0.961 | 0.97 | 2254 | 1005 |
| Comp. Ex. i10 | Ti |   | 1.60 | 0.961 | 0.97 | 2255 | 1008 |
| Comp. Ex. i11 | Zr |   | 1.60 | 0.961 | 0.97 | 2242 | 1004 |
| Comp. Ex. i12 | W |   | 1.60 | 0.961 | 0.98 | 2245 | 1005 |
| Comp. Ex. i13 | Nb | 0.1 | 1.37 | 0.931 | 0.81 | 1777 | 1650 |
| Comp. Ex. i14 | Mn |   | 1.37 | 0.931 | 0.82 | 1874 | 1770 |
| Comp. Ex. i15 | Mo |   | 1.37 | 0.931 | 0.84 | 1870 | 1781 |
| Comp. Ex. i16 | Ti |   | 1.37 | 0.931 | 0.83 | 1881 | 1752 |
| Comp. Ex. i17 | Zr |   | 1.37 | 0.931 | 0.81 | 1835 | 1746 |
| Comp. Ex. i18 | W |   | 1.37 | 0.931 | 0.84 | 1825 | 1718 |
| Comp. Ex. i19 | Nb | 0.08 | 1.55 | 0.964 | 0.95 | 2305 | 1415 |
| Comp. Ex. i20 | Mn |   | 1.55 | 0.964 | 0.96 | 2307 | 1420 |
| Comp. Ex. i21 | Mo |   | 1.55 | 0.964 | 0.94 | 2310 | 1424 |
| Comp. Ex. i22 | Ti |   | 1.55 | 0.964 | 0.94 | 2321 | 1420 |
| Comp. Ex. i23 | Zr |   | 1.55 | 0.964 | 0.95 | 2315 | 1417 |
| Comp. Ex. i24 | W |   | 1.55 | 0.964 | 0.94 | 2315 | 1427 |
| Comp. Ex. i25 |   | None | 1.42 | — | 0.90 | 1040 | 997 |

Evaluation 1
(Discharge Characteristics)

Each battery was subjected to pre-charge/discharge twice, after which the battery was stored in an environment of 40° C. for 2 days. Thereafter, the following two cycle patterns were repeated for each battery. Note that the design capacity of the batteries was set to 1 CmAh.

First Pattern (Normal Cycle Test)
(1) Constant current charge (25° C.): 0.7 CmA (end voltage: 4.2 V)
(2) Constant voltage charge (25° C.): 4.2 V (end current: 0.05 CmA)
(3) Charge rest (25° C.): 30 minutes
(4) Constant current discharge (25° C.): 1 CmA (end voltage: 2.5 V)
(5) Discharge rest (25° C.): 30 minutes Second Pattern (Intermittent Cycle Test)
(1) Constant current charge (25° C.): 0.7 CmA (end voltage: 4.2 V)
(2) Constant voltage charge (25° C.): 4.2 V (end current: 0.05 CmA)
(3) Charge rest (25° C.): 720 minutes
(4) Constant current discharge (25° C.): 1 CmA (end voltage: 2.5 V)
(5) Discharge rest (25° C.): 720 minutes The discharge capacities after 500 cycles obtained in the first and second patterns are shown together with wp/wn ratio and the value of x in Tables 1A, 1B, 2A, 2B, 3A, 3B, 4A, 4B, 5A, 5B, 6A, 6B, 7A, 7B, 8A, 8B, 9A and 9B.

Evaluation was also made for lithium composite oxides synthesized using various raw materials instead of the above-described coprecipitated hydroxides, but the description thereof is omitted.

Industrial Applicability

The present invention is useful in lithium ion secondary batteries including, as a positive electrode active material, a lithium composite oxide composed mainly of nickel. According to the present invention, cycle characteristics (e.g., intermittent cycle characteristics) under conditions that are close to the actual operating conditions of lithium ion secondary batteries can be further enhanced relative to conventional ones without inhibiting the suppression effect of heat generation at the time of gas generation or internal short-circuiting.

The shape of the lithium ion secondary battery of the present invention is not particularly limited, and it can be any shape such as a coin type, button type, sheet type, cylindrical type, flat type or prismatic type. Form of an electrode plate assembly comprising a positive electrode, a negative electrode and a separator may be spirally-wound type or laminate type. The size of the battery may be small for use in small portable devices or large for use in electric vehicles. The lithium ion secondary battery of the present invention can be used, for example, as a power source for portable digital assistants, portable electronic devices, small power storage devices for home use, motorcycles, electric vehicles, hybrid electric vehicles, etc. However, the application is not particularly limited.

The invention claimed is:

1. A lithium ion secondary battery comprising:
a positive electrode capable of charging and discharging;
a negative electrode capable of charging and discharging; and
a non-aqueous electrolyte,
wherein said positive electrode includes positive electrode active material particles, represented by general formula (2): $Li_xNi_{1-y}M_yMe_zO_{2+\delta}$, comprising:
lithium composite oxide particles represented by general formula (1): $Li_xNi_{1-y}M_yO_2$, and an oxide containing an element Me deposited on a surface of said lithium composite oxide,
wherein in said general formulas (1) and (2):
x indicates a lithium content, y indicates an element M content, z indicates an element Me content, and δ indicates an oxygen content in said oxide containing said element Me,
$0<y\leq0.75$, and $0.001\leq z\leq0.05$,
said element M is at least one selected from the group consisting of alkaline-earth elements, transition elements, rare-earth elements, IIIb group elements, and IVb group elements,
said element Me is at least one selected from the group consisting of Mn, W, Nb, Ta, In, Mo, Zr, and Sn,
said element M is different from said element Me, and
$0.85\leq x\leq-0.013\cdot\ln(z)+0.871$ is satisfied when said lithium ion secondary battery is in an end-of-discharge state after undergoing constant current discharge under the conditions of a 25° C. ambient temperature, a current value of 1 hour rate (1 C), and a 2.5 V end-of-discharge voltage,
said positive electrode active material particles have an average particle size of 10 µm to 30 µm,
said negative electrode includes negative electrode active material particles including graphite particles, and
a wp/wn ratio of a weight wp of said positive electrode active material to a weight wn of said negative electrode active material is 1.45 to 1.56.

2. The lithium ion secondary battery in accordance with claim 1, wherein said element M comprises at least one selected from the group consisting of Co, Mn, Al, Mg, Ca, B, W, Nb, Ti, Ta, In, Mo, and Sn.

3. The lithium ion secondary battery in accordance with claim 1, wherein said non-aqueous electrolyte comprises at least one selected from the group consisting of vinylene carbonate, vinyl ethylene carbonate, phosphazene, and fluorobenzene.

* * * * *